United States Patent
Toyoda et al.

(10) Patent No.: US 6,647,210 B1
(45) Date of Patent: Nov. 11, 2003

(54) DELAY ADJUSTMENT UNIT AND METHOD, OPTICAL NETWORK UNIT, AND COMMUNICATION SYSTEM

(75) Inventors: Yoshimi Toyoda, Osaka (JP); Takashi Monzawa, Osaka (JP); Tamotsu Matsuo, Osaka (JP); Kenji Miura, Osaka (JP); Jun Asato, Osaka (JP); Toshinori Koyanagi, Kawasaki (JP); Setsuo Abiru, Kawasaki (JP); Toshiyuki Sakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/547,319

(22) Filed: Apr. 11, 2000

(30) Foreign Application Priority Data

Apr. 16, 1999 (JP) .......................................... 11-109688

(51) Int. Cl.[7] .................................................. H04J 14/08
(52) U.S. Cl. ........................... 398/102; 398/98; 398/99; 398/100
(58) Field of Search ..................... 359/140; 370/503; 398/1, 2, 100, 167.5

(56) References Cited

U.S. PATENT DOCUMENTS

| | | | | |
|---|---|---|---|---|
| 5,327,277 A | * | 7/1994 | Van Der Plas et al. | 359/140 |
| 5,357,360 A | * | 10/1994 | Imhoff et al. | 359/125 |
| 5,406,559 A | * | 4/1995 | Edem et al. | 370/516 |
| 5,488,501 A | * | 1/1996 | Barnsley | 359/137 |
| 5,666,366 A | * | 9/1997 | Malek et al. | 370/505 |
| 5,912,998 A | * | 6/1999 | Quayle | 385/24 |
| 6,064,652 A | * | 5/2000 | Buckland et al. | 370/235 |
| 6,262,997 B1 | * | 7/2001 | Quayle | 370/503 |
| 6,317,234 B1 | * | 11/2001 | Quayle | 359/125 |

FOREIGN PATENT DOCUMENTS

EP  0 896 492 A1  2/1999

\* cited by examiner

*Primary Examiner*—Leslie Pascal
*Assistant Examiner*—David C Payne
(74) *Attorney, Agent, or Firm*—Katten Muchin Zavis Rosenman

(57) ABSTRACT

A delay adjustment unit and optical network unit which efficiently adjust the delay time of upstream data to improve the quality of data transmission services. Upstream transmission data is segmented into small data blocks. A downstream receiver receives control information on which upstream data blocks are granted or not granted to the unit. It also received an equalization delay update request that commands the unit to update its current equalization delay parameter. When this equalization delay update request is received, a delay adjustment controller controls the delay of each data block, depending on whether the transmission of each subsequent data block is granted. An upstream transmitter then transmits the granted data blocks with the adjusted delay times.

20 Claims, 26 Drawing Sheets

DELAY ADJUSTMENT UNIT AND METHOD, OPTICAL NETWORK UNIT, AND COMMUNICATION SYSTEM

BACKGROUND OF THE INVENTION

1. Field of the Invention

The present invention relates to a delay adjustment unit and method, an optical network unit, and a communication system. More particularly, the present invention relates to a delay adjustment unit and method which perform delay adjustments when transmitting data to a network. The invention further relates to an optical network unit coupled to an optical access network system, which transmits upstream data after making a delay adjustment thereto. The present invention also relates to a communication system which transports a data signal after making delay adjustments.

2. Description of the Related Art

Increasing numbers of telecommunication and multimedia services are provided today to serve for the growing market needs, including video on demand, cable TV, and high-speed access to computer networks. To provide those high-bandwidth services without raising the cost to subscribers, optical access network systems are expected to play an essential role, connecting subscriber premises to the nearest local office exchange through fiber optic cables, rather than conventional metallic wires.

One example of such optical access network systems is called "Passive Double Star (PDS)," which enables a plurality of subscribers to share a single optical fiber line by using star couplers. Particularly in Europe, the Passive Optical Network (PON) system, synonymous with PDS, is of great interest as an enabling technology for the "Fiber to the Home" (FTTH) services. In the scenarios toward FTTH, the access network has to provide guaranteed bandwidths and quality of services to meet the requirements for real-time voice and video communication. To this end, the Full Service Access Networks (FSAN) initiative has a central role in the development of ATMPON systems based on the Asynchronous Transfer Mode (ATM) technologies. The FSAN is an organization formed by major telephone companies to promote worldwide optical network businesses.

FIG. 25 shows a typical structure of an ATM-PON system. In this system, optical network units (ONUs) 101a to 101n are deployed in subscriber premises 100a to 100n, while an optical line terminal (OLT) 201 is placed in a local office 200. Fiber optic cables and a star coupler 300 permit those ONUs 101a to 101n to connect to the OLT 201 in a point-to-multipoint fashion. Within the subscriber premises 100a to 100n, telephone equipment and/or CATV equipment is coupled to the ONUs 101a to 101n. Connected to the OLT 201 in the local office 200 is ATM and ISDN switching equipment 202.

In the downstream direction, the local office 200 broadcasts data (i.e., downstream cells) toward the subscriber premises 100a to 100n over a single optical fiber cable. The star coupler 300 splits the optical signal into a plurality of signals in a tree and branch form, so as to deliver the information to individual subscribers' ONUs. In the upstream direction, ATM cells are transmitted from the subscriber premises 100a to 100n toward the local office 200 over the same branch cables. The star coupler 300 consolidates them into a single optical signal for delivery to the local office 200 over a single fiber cable.

As explained above, the ATM-PON system is defined as an ATM-based, optically-coupled access network which provides point-to-multipoint (1:n) connections between a local office and a plurality of customers through the use of a star coupler 300. The OLT 201 communicates with the ONUs 101a to 101n, sending cells back and forth over the ATM-PON network. The ONUs 101a to 101n transmit upstream cells (e.g., cells "a," "b," ... "n" in FIG. 25) with different time delays to prevent the cells from colliding with each other. Actually, the OLT 201 controls those delays by supplying the individual ONUs 101a to 101n with parameters called the "equalization delays" in some downstream cells. Because the amount of delay time may vary with the operating conditions (e.g., variations in the ambient temperature), the OLT 201 always monitors the deviation in upstream cell delays, and if necessary, updates the equalization delay parameters to compensate for the observed deviation.

Such a conventional system has a problem in handing new equalization delay parameters. Suppose, for example, that a certain ONU (e.g., ONU 101a) has received a new equalization delay parameter that is smaller than the current one. The ONU 101a activates this new parameter. But if this is done in the middle of the transmission of upstream cells, some of those cells would collide with each other, resulting in a loss of transmission data.

Normally, the ONUs 101a to 101n has two separate units to process transmission data: one for processing downstream cells, and the other for processing upstream cells. To handle downstream cells, the downstream cell processing unit uses a clock extracted from the downstream signal. On the other hand, the upstream cell processing unit handles upstream cells, using a clock signal that is supplied by its integral oscillator (PLO). Note that this PLO clock signal is phase-locked with the above downstream clock signal.

When a new equalization delay and other related information is received through the downstream channel, the ONU has to make this new setup information reflected correctly in the downstream cell processing unit. To achieve this, the two cell processing units have to operate in phase with each other. In actuality, however, tracking and maintaining a correct clock phase is not an easy task. Particularly, bursty errors in a downstream cell could cause a large amount of phase shift, which cannot be dealt with the receiving ONU's PLL alone. Because of the lack of continuous downstream data, conventional ONUs are unable to extract clock timing from the downstream signal. When there is a large phase difference between the upstream clock and downstream clock, conventional ONUs forcibly adjust their clock phases in an attempt to cancel the phase difference at a time. This hasty adjustment causes some data loss, meaning that conventional ONUs cannot guarantee correct data delivery in such a situation.

SUMMARY OF THE INVENTION

Taking the above into consideration, an object of the present invention is to provide a delay adjustment unit which efficiently adjusts the delay of cells to make high quality data transmission possible.

To accomplish the above object, according to the present invention, there is provided a delay adjustment unit which transmits upstream data composed of a plurality of data blocks making a delay adjustment to them. This delay adjustment unit comprises the following elements: a downstream receiver which receives control information on which data blocks are granted or not granted, together with an equalization delay update request that requests the delay adjustment unit to update an equalization delay parameter being held therein; a delay adjustment controller which controls the delay time of the granted or non-granted data blocks specified in the control information, when the equalization delay update request is detected; and an upstream transmitter which transmits the data blocks with the adjusted delay times.

Another object of the present invention is to provide an optical network unit which efficiently adjusts the delay of cells to make high quality data transmission possible.

To accomplish the above second object, according to the present invention, there is provided an optical network unit, coupled to an optical access network system, which transmits upstream data composed of a plurality of upstream cells after making a delay adjustment to the upstream cells. This optical network unit comprises the following elements: a downstream receiver which receives control information on which upstream cells are granted or not granted, together with an equalization delay update request that requests the optical network unit to update an equalization delay parameter being held therein; a delay adjustment controller which controls the delay time of the granted or non-granted data blocks specified in the control information, when the equalization delay update request is detected; and an upstream transmission unit which transmits the upstream cells with the adjusted delay times.

Still another object of the present invention is to provide a communication system which efficiently adjusts the delay of cells to make high quality data transmission possible.

To accomplish the above third object, according to the present invention, there is provided a communication system which transports a data signal after making delay adjustments. This system comprises an optical line terminal and an optical network unit. The optical line terminal comprises the following elements: a downstream data producing unit which produces downstream data containing control information on which upstream cells are granted or not granted; and a downstream transmitter which transmits the produced downstream data. The optical network unit comprises the following elements: a downstream receiver which receives the downstream data; a delay adjustment controller which controls delay times of the granted or non-granted upstream cells specified in the control information, when an equalization delay update request is detected; and an upstream transmitter which transmits the upstream cells with the adjusted delay times.

Still another object of the present invention is to provide a delay adjustment method which efficiently adjusts the delay of cells to make high quality data transmission possible.

To accomplish the above fourth object, according to the present invention, there is provided a delay adjustment method which transmits upstream data composed of a plurality of upstream cells after making a delay adjustment thereto. This method comprises the steps of: receiving downstream data containing control information on whether the transmission of each upstream cell is granted or not granted; when an equalization delay update request that requests an update of an equalization delay parameter is received, controlling delay times of the granted or non-granted upstream cells, according to the received control information; and sending upstream data with the adjusted delay times.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram which shows what the term "delay" refers to;

DESCRIPTION OF THE PREFERRED EMBODIMENTS

Preferred embodiments of the present invention will be described below with reference to the accompanying drawings.

Figure 1:
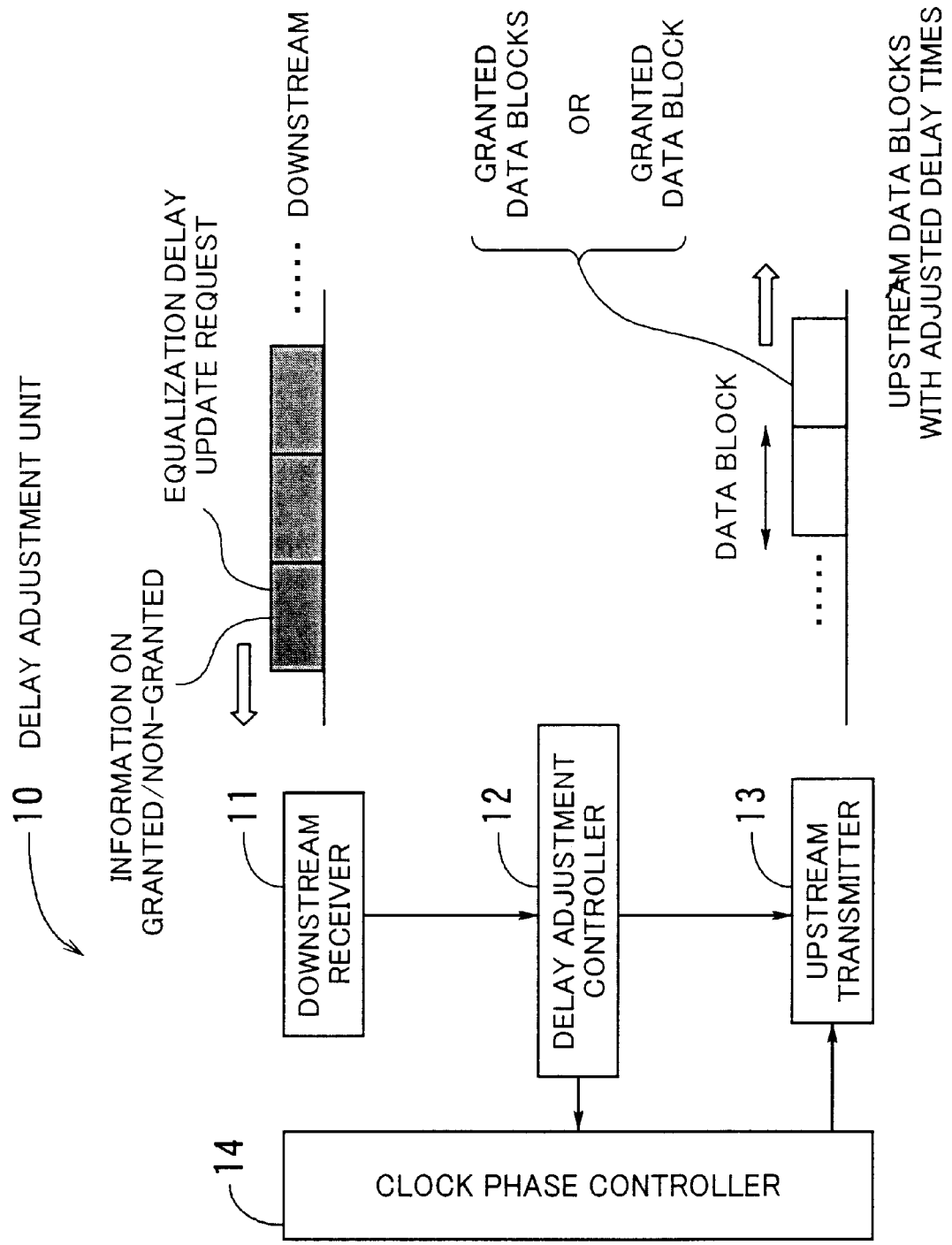
FIG. 1 is a conceptual view of a delay adjustment unit according to the present invention.

FIG. 1 is a conceptual view of a delay adjustment unit according to the present invention. This delay adjustment unit 10 transmits data to its upstream device after making an adjustment to the delay time of the data in accordance with delay adjustment commands sent from the upstream device. Note here that the delay adjustment unit 10 performs each upstream transmission not freely, but under the control of the upstream device. That is, the delay adjustment unit 10 has to obtain a permission from the upstream device.

The proposed delay adjustment unit 10 comprises the following elements: a downstream receiver 11, a delay adjustment controller 12, an upstream transmitter 13, and a clock phase controller 14. The downstream receiver 11 receives downstream data, which is segmented into small data blocks. It also receives control information on which upstream data blocks are granted or not granted to the delay adjustment unit 10. Here, the "granted data blocks" refer to such upstream data blocks whose permission is granted to the delay adjustment unit 10. The "non-granted data blocks" are those whose permission is not granted to the delay adjustment unit 10. The details of granted and not-granted blocks will be described later with reference to FIG. 2.

The down stream receiver 11 further receives an equalization delay update request which includes a new equalization delay parameter specified by the upstream device. This request causes the delay adjustment unit 10 to update its current equalization delay parameter with the specified new one. The delay adjustment controller 12 then makes a delay adjustment according to the new equalization delay parameter specified by the upstream device. Advantageously, this delay adjustment process depends on the types of upstream data blocks. More specifically, the delay adjustment controller 12 performs delay adjustments depending on whether each subsequent data block is a granted data block or non-granted data block.

If an equalization delay update request is detected just before a granted data block, the delay adjustment controller 12 manipulates the block's guard bit field to adjust the delay time in a bit-by-bit fashion. Where appropriate, the delay adjustment controller 12 may fully apply the newly specified equalization delay parameter to the next granted block, after the equalization delay update request is received. In this case, the phase adjustment is conducted not in a bit-by-bit fashion, but all at once, regardless of how many bits should be inserted or removed. The details of this operation will be described later.

The upstream transmitter 13 transmits the upstream data blocks to the upstream device, each block having a delay time adjusted by the delay adjustment controller 12. The clock phase controller 14 adjusts the phase relationships between the downstream data blocks and the upstream data blocks in a bit-by-bit fashion. The details of this controller 14 will be presented in a later part.

Figure 2:
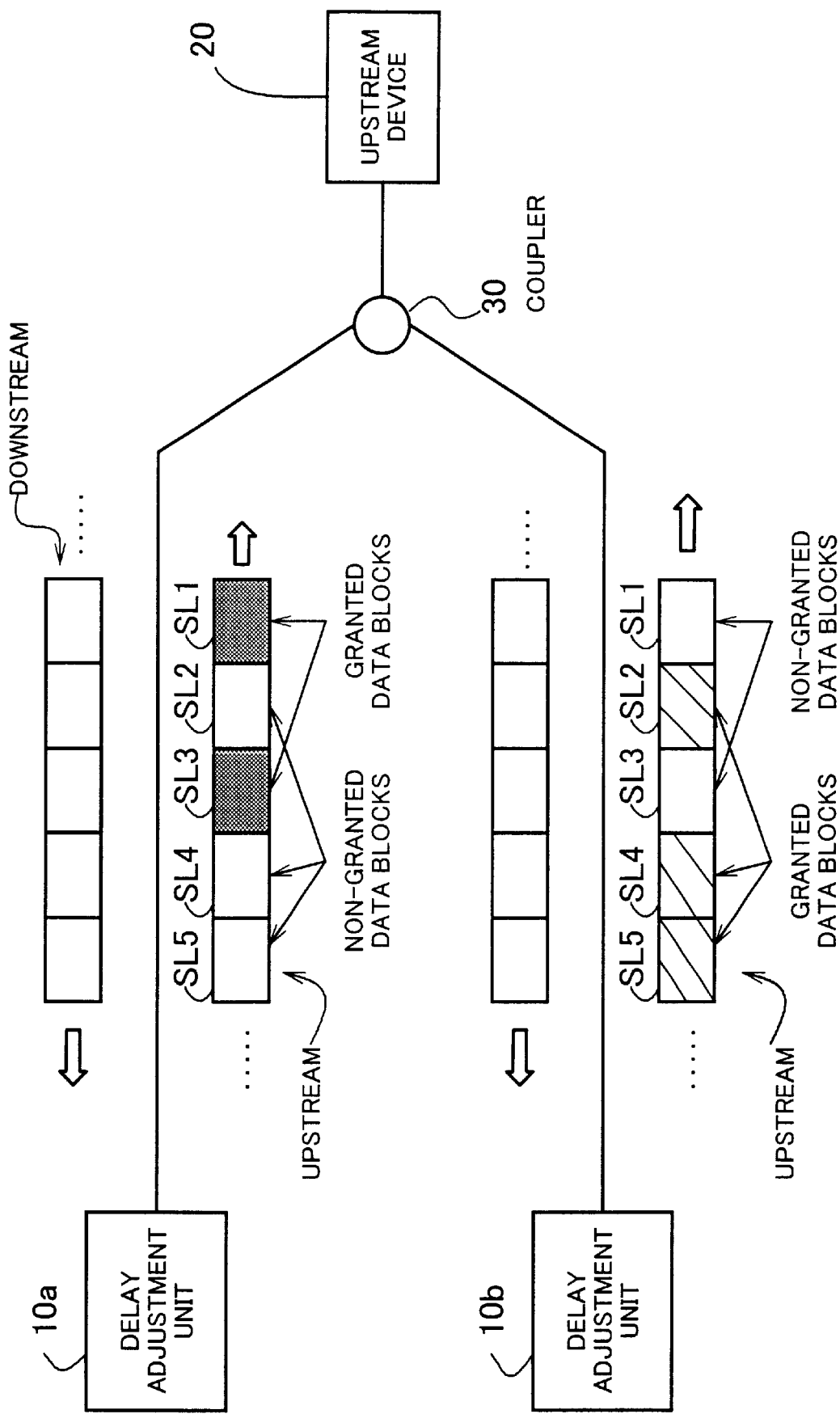
FIG. 2 is a diagram which explains granted data blocks and non-granted data blocks.
Figure 20:
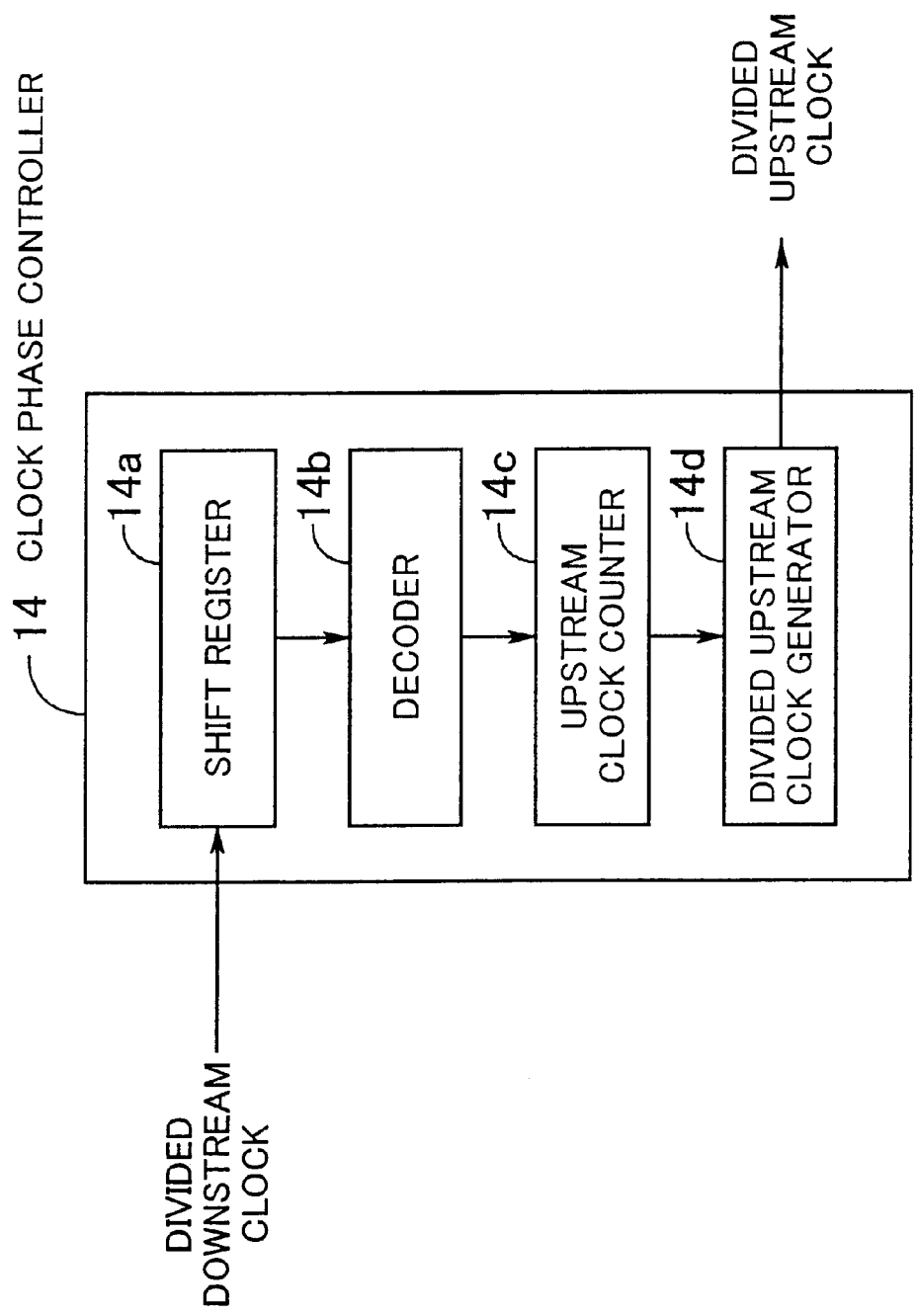
FIG. 20 is a diagram which shows the structure of a clock phase controller according to the present invention.

Referring next to FIG. 2, the granted data blocks and non-granted data blocks will be explained below. Here, two delay adjustment units 10a and 10b are linked to its upstream device 20 via a coupler 30. The upstream device 20 broadcasts a downstream frame toward the two delay adjustment units 10a and 10b as shown in FIG. 20. The first time slot of the downstream frame carries control information which indicates which upstream data blocks are granted to the delay adjustment unit 10a, as well as which upstream data block are granted to the other delay adjustment unit 10b.

It is assumed here that the time slots SL1 and SL3 are granted to the delay adjustment unit 10a, while the other time slots SL2, SL4, and SL5 are granted to the delay adjustment unit 10b. This, in turn, means that the delay adjustment unit 10a cannot send its data in slots SL2, SL4, and SL5, and the delay adjustment unit 10b cannot send its data in slots SL1 and SL3. FIG. 2 shows that the delay adjustment unit 10a sends its upstream data blocks in slots SL1 and SL3 (shaded). That is, the upstream device 20 and delay adjustment unit 10a use slots SL1 and SL3 to communicate with each other.

Likewise, the other delay adjustment unit lob sends its upstream data blocks in slots SL2, SL4, and SL5 (hatched). That is, the upstream device 20 and delay adjustment unit 10b use slots SL2, SL4, and SL5 to communicate with each other.

Figure 3:
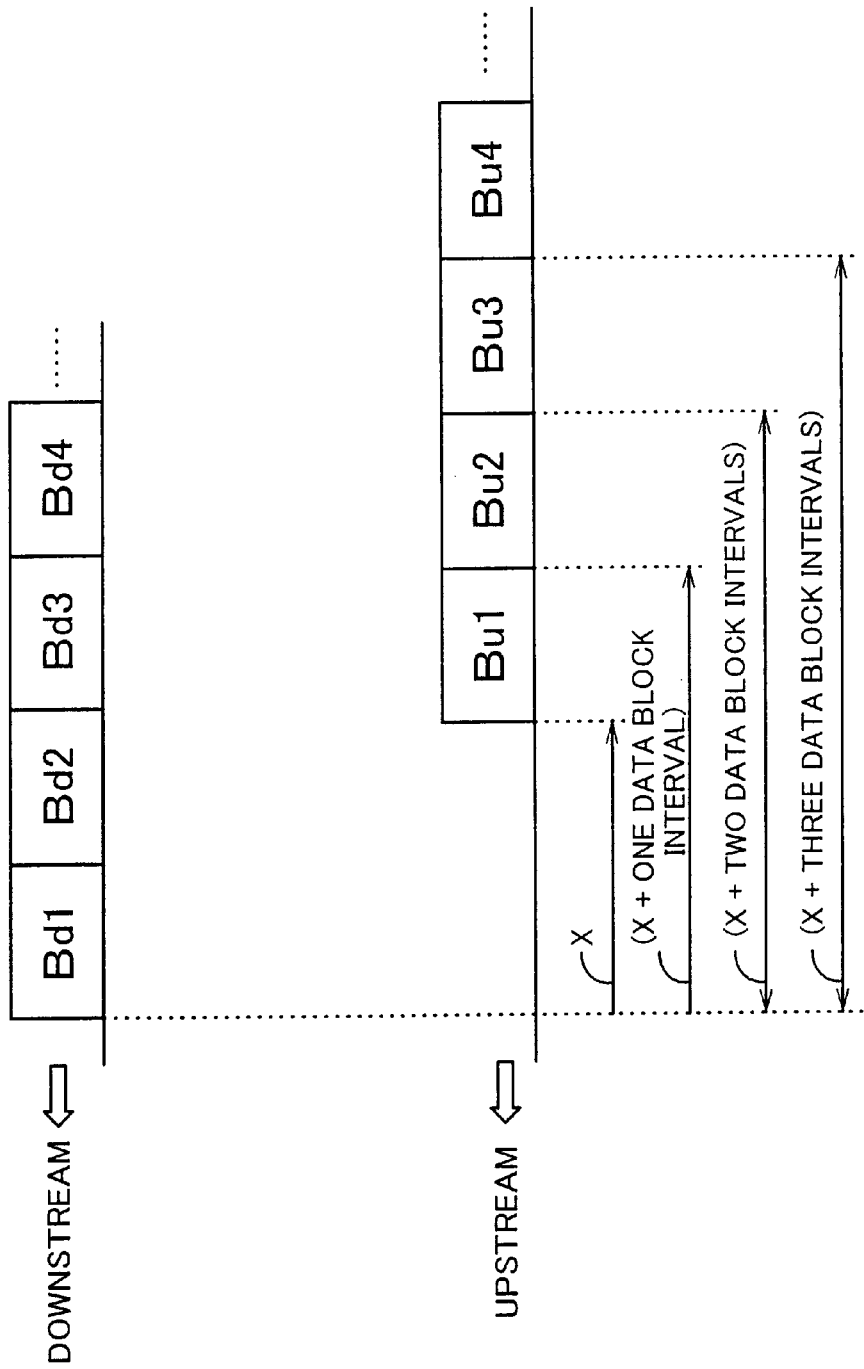

Referring to FIG. 3, the following section will explain what the term "delay" refers to in the present context. Downstream data blocks are named "Bd1" to "Bd4," while upstream data block are named "Bu1" to "Bu4." The delay time of an upstream data block is defined relative to the beginning of the downstream frame. Let X be the current equalization delay parameter value. The first upstream data block Bu1 is transmitted after the delay time X with respect to the beginning of the downstream frame, and the second upstream data block Bu2 is transmitted after a delay time of (X+one data block interval). The third and fourth data blocks Bu3 and Bu4 are delayed in a similar manner.

The above-described delay adjustment unit 10 can be applied to optical network units as follows. The proposed optical network unit (ONU) 10, coupled to an optical access network system (e.g., ATM-PON), makes delay adjustments in accordance with the commands from an OLT serving as its upstream device. With the adjusted delay time, the ONU 10 transmits upstream data to the OLT.

Figure 4:
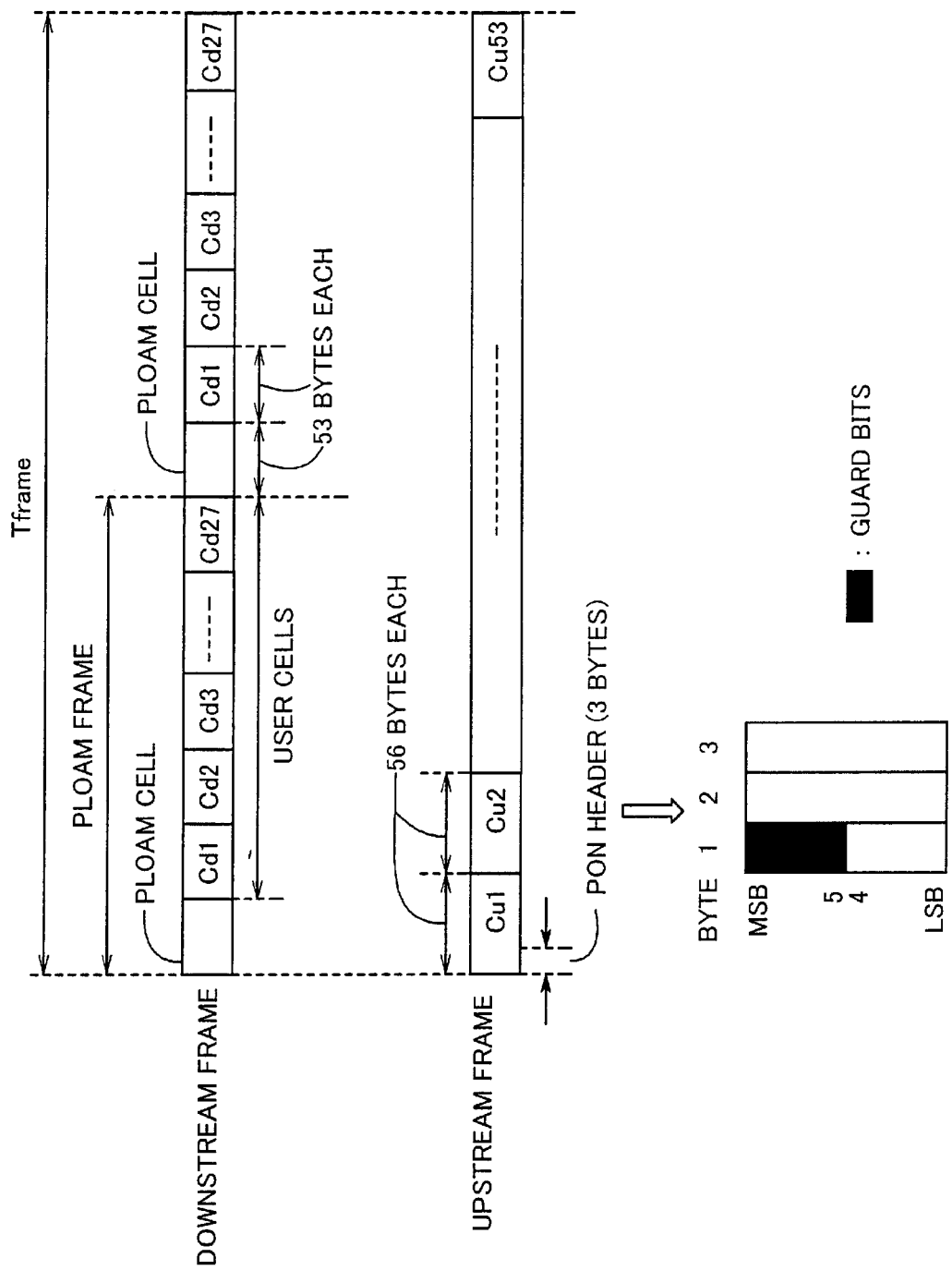
FIG. 4 is a diagram which shows the structure of upstream and downstream frames.

FIG. 4 shows the structure of upstream and downstream frames, which is defined in the ITU-T Recommendation G.983.1.

Physical Layer Operation and Management (PLOAM) frames constitute a data stream sent from the OLT. Each PLOAM frame begins with a PLOAM cell carrying control information from OLT to ONUs, which is followed by twenty-seven user cells Cd1 to Cd27 each containing transmission data. Tframe refers to the period of two PLOAM frame intervals in the case of 155.52 Mbps transmission rate. Both PLOAM and user cells are ATM cells each consisting of 53 bytes. The cells, including PLOAM cells and user cells, are what have been referred to as the data blocks in FIG. 1. In the G.983.1 terminology, "grant" is a permission to transmit an upstream cell of each ONU. The PLOAM cell in each PLOAM frame has "grant" fields of 27 byte to carry the grants for 27 upstream user cells. Since each Tframe contains 53 upstream cells, the last grant within the second PLOAM cell must be an idle grant. When, for example, the OLT allows the ONU 10 to use two upstream time slots of user cells Cu1 and Cu2, the ONU 10 can find this permission in each PLOAM cell that it receives. More specifically, the fourth and fifth bytes of the PLOAM cell payload field carry the grant information for upstream user cells Cu1 and Cu2.

As previously noted, each upstream Tframe is organized by 53 user cells Cu1 to Cu53, each cell having a length of 56 bytes (3-byte PON overhead+53-byte ATM cell). Any of those user cell slots Cu1 to Cu53 can contain an upstream PLOAM information. To provide enough distance between two consecutive cells to avoid collisions, G.983.1 defines the most significant four bits of the PON overhead as "guard bits." If necessary, the OLT can assign some more bits in the PON overhead as additional guard bits.

Figure 5:
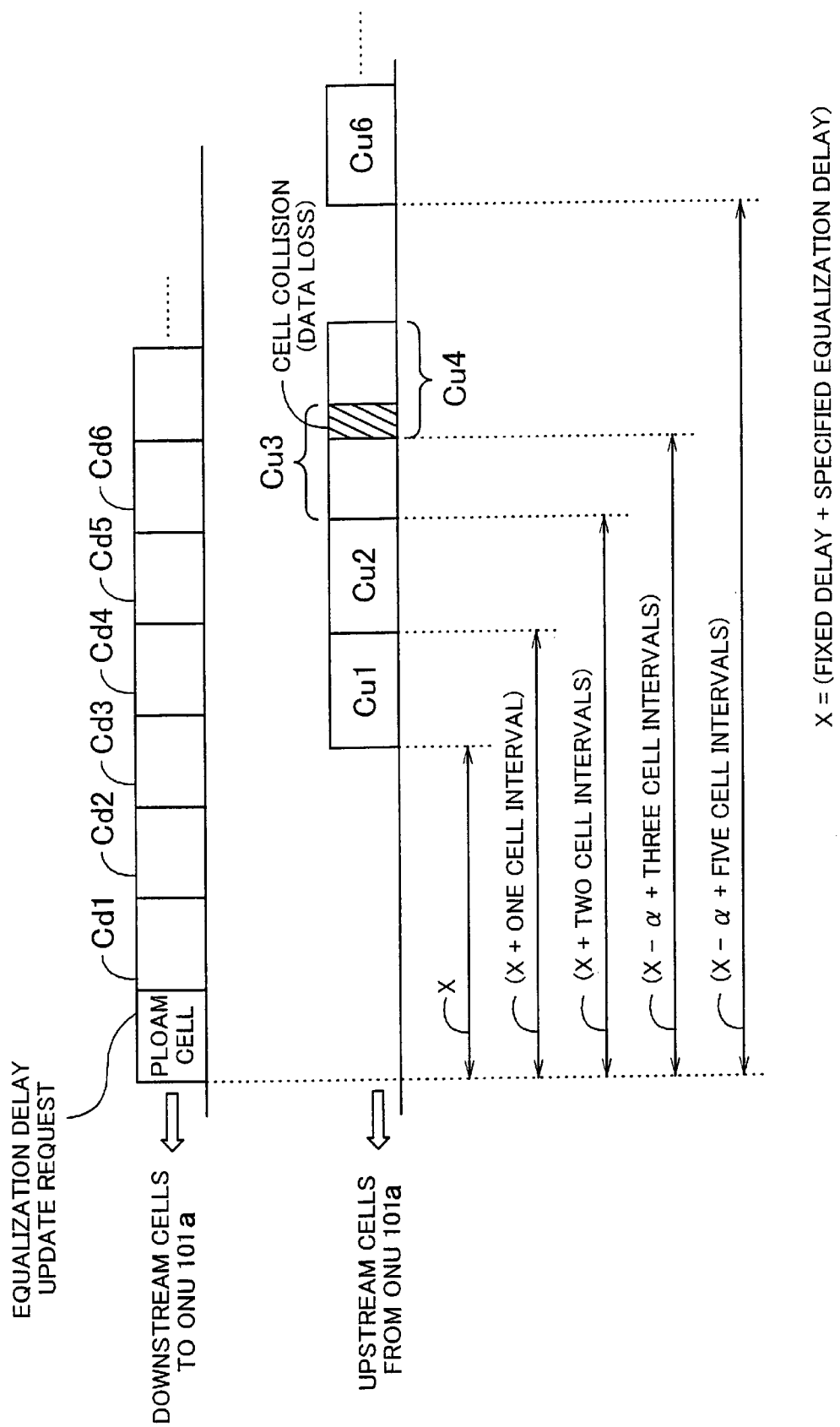
FIG. 5 is a diagram which shows a collision between consecutive cells.

Referring next to FIG. 5, the problem of upstream cell collisions will be explained below. FIG. 5 shows an example of a cell collision that may happen in a conventional ONU (e.g., ONU 101a in FIG. 25) when it performs delay adjustment. It is assumed here that the downstream PLOAM cell contains grant bytes indicating that the OLT permits the ONU 101a to use five cell time slots of cells Cu1, Cu2, Cu3, Cu4, and Cu6. Suppose that the PLOAM cell gives a new equalization delay, and the ONU 101a has recognized this at the timing of the third cell time slot Cu3. Then the conventional ONU 101a activates the new equalization delay immediately from the next granted time slot, i.e., the slot of Cu4.

The delay time X of the first upstream cell Cu1 is given as the sum of a certain fixed delay time within the ONU 101a and the current equalization delay parameter specified by the OLT through a PLOAM cell. According to G983.1, this delay time shall be between seven and nine cells (with a 56-byte cell). The first upstream cell Cu1 is transmitted after the delay time X with respect to the top of the downstream frame. Likewise, the second upstream cell Cu2 is transmitted after a delay time of (X+one cell interval), and the third upstream cell Cu3 after a delay time of (X+two cell intervals), relative to the beginning of the downstream frame.

In the context of FIG. 5, the upstream cell delay time is reduced from X to (X−α) as a result of the update made to the equalization delay parameter. With the new parameter, the conventional ONU 101a begins transmission of the fourth upstream cell Cu4 after a delay time of (X−+three cell intervals). This Cu4, however, collides with the ongoing bit stream of Cu3, resulting in data loss in the both cells Cu3 and Cu4. The fifth cell time slot is vacant because it is not granted to the ONU 101a. After that, the ONU 101a transmits the sixth cell Cu6 with a delay time of (X−α+five cell intervals).

As explained above, upstream cells transmitted from the ONU 101a could locally collide with each other, when a newly given equalization delay parameter is smaller than the current one. This is because the conventional ONU 101a updates its equalization delay even when it is sending out an upstream cell. Data loss caused by cell collisions would degrade the quality of data transmission in the ATM-PON system.

Figure 6:
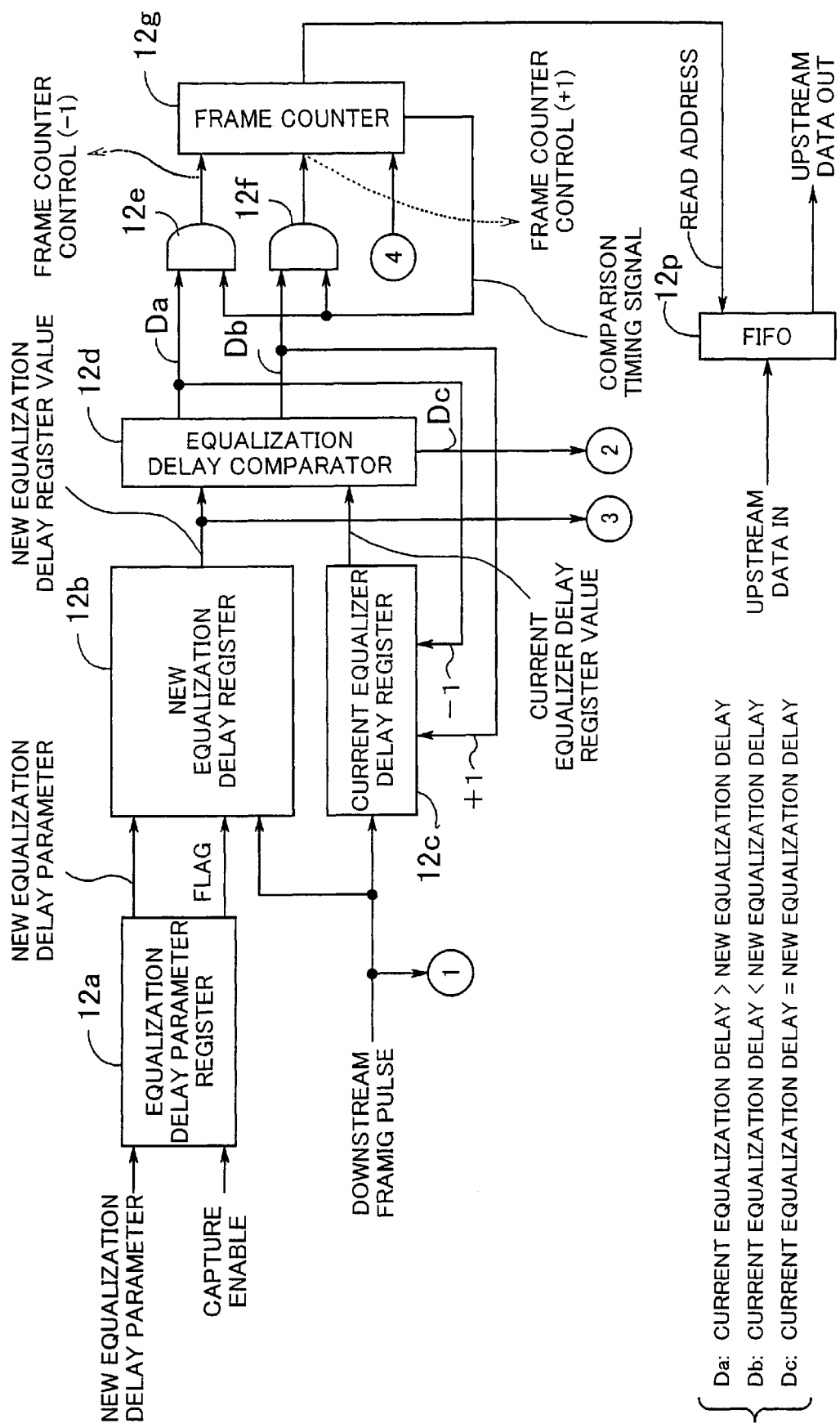
FIGS. 6 and 7 are schematic diagrams showing the structure of a delay adjustment controller.
Figure 7:
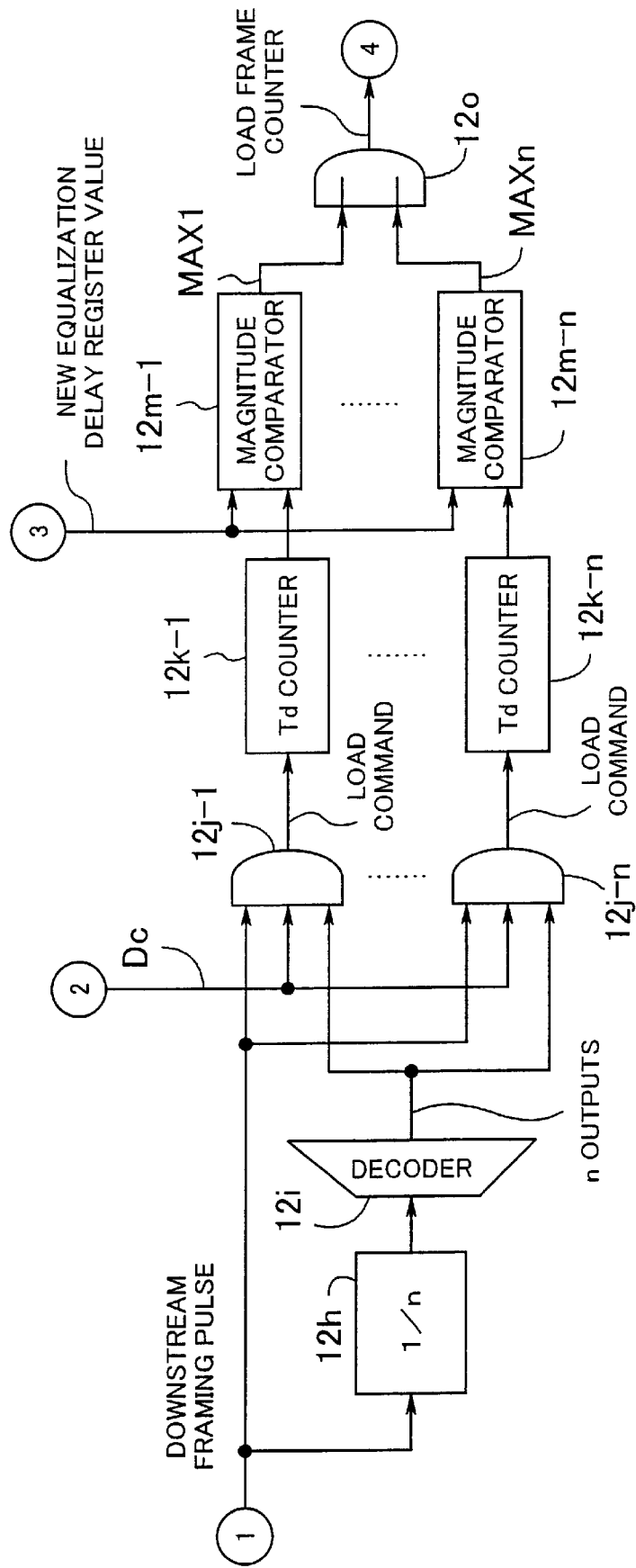

The present invention solves the above-described problem in the update of equalization delay by providing an improved delay adjustment controller 12 in the ONU 10. FIGS. 6 and 7 are schematic diagrams showing the structure of this delay adjustment controller 12. Referring first to FIG. 6, the controller 12 comprises an equalization delay parameter register 12a which captures a new value of equalization delay (referred to herein as the "new equalization delay parameter") when its capture enable input signal is activated. The equalization delay parameter register 12a provides a flag to indicate that a new equalization delay parameter is available. If the flag is set when a downstream framing pulse is received, a new equalization delay register 12b loads the new parameter from the equalization delay parameter register 12a. A current equalization delay register 12c holds the current value of the equalization delay when the downstream framing pulse is entered. This value is referred to herein as the "current equalization delay parameter." An equalization delay comparator 12d compares the new equalization delay parameter with the current equalization delay parameter, thereby outputting three kinds of result status signals Da, Db, and Dc. The signal Da becomes "high" (high level) when the current equalization delay parameter is greater than the new one. The signal Db becomes "high" when the current equalization delay parameter is smaller than the new one. The signal Dc becomes "high" when the current equalization delay parameter equals the new one. The signal Da is fed to the previous equalizer delay register 12c to decrement its value, while the signal Db is fed to the register 12c to increment its value.

The frame counter 12g produces a timing signal to sample the above comparison results, which is asserted at the end of every cell frame. AND gates 12e and 12f perform logical AND operations between the comparison timing signal and the comparison result signals Da and Db, respectively. The output of the AND gate 12e, "frame counter control (−1)," causes the frame counter 12g to reduce its cycle period by one unit interval. On the other hand, the output of the AND gate 12f, "frame counter control (+1)," causes the frame counter 12g to extend its cycle period by one unit interval.

The count output of the frame counter 12g drives the read address of a FIFO 12p which buffers upstream data to be sent out to the OLT.

Referring to FIG. 7, a divide-by-n circuit (or 1/n divider) 12h produces a binary code by dividing downstream framing pulses by an integer number n, and a decoder 12i decodes the binary code into n signals. AND gates 12j-1 to 12j-n receive these decoded signals, together with the downstream framing pulses and comparison result signal Dc. The outputs of those AND gates 12j-1 to 12j-n are supplied to the load inputs of Td counters 12k-1 to 12k-n, respectively. In other words, the signals entered to the AND gates 12j-1 to 12j-n will serve as load enable signals for the Td counters 12k-1 to 12k-n.

Magnitude comparators 12m-1 to 12m-n compare the outputs of the Td counters 12k-1 to 12k-n with the new equalization delay parameter stored in the new equalization delay register 12b. If the Td counter values agree with the new equalization delay parameter, those magnitude comparators 12m-1 to 12m-n will assert high-active signals MAX1 to MAXn, respectively, to indicate that the counters have reached the maximum value. The outputs of the magnitude comparators 12m-1 to 12m-n are supplied to an OR gate 12o, where they are ORed into a frame counter load command signal. Here, the Td counters 12k-1 to 12k-n each produce a delay to be applied to the first upstream cell, counting the time that has elapsed since the top of each downstream frame. Once triggered at the beginning of a certain frame, one Td counter should not be reloaded with the initial value until it reaches the specified maximum value. Therefore, another Td counter has to be used for the subsequent frame, when a large equalization delay parameter exceeding one Tframe is given. This means that n Td counters are required in order to support large equalization delays up to n frames. Note that they would operate concurrently, but in different phases.

Figure 8:
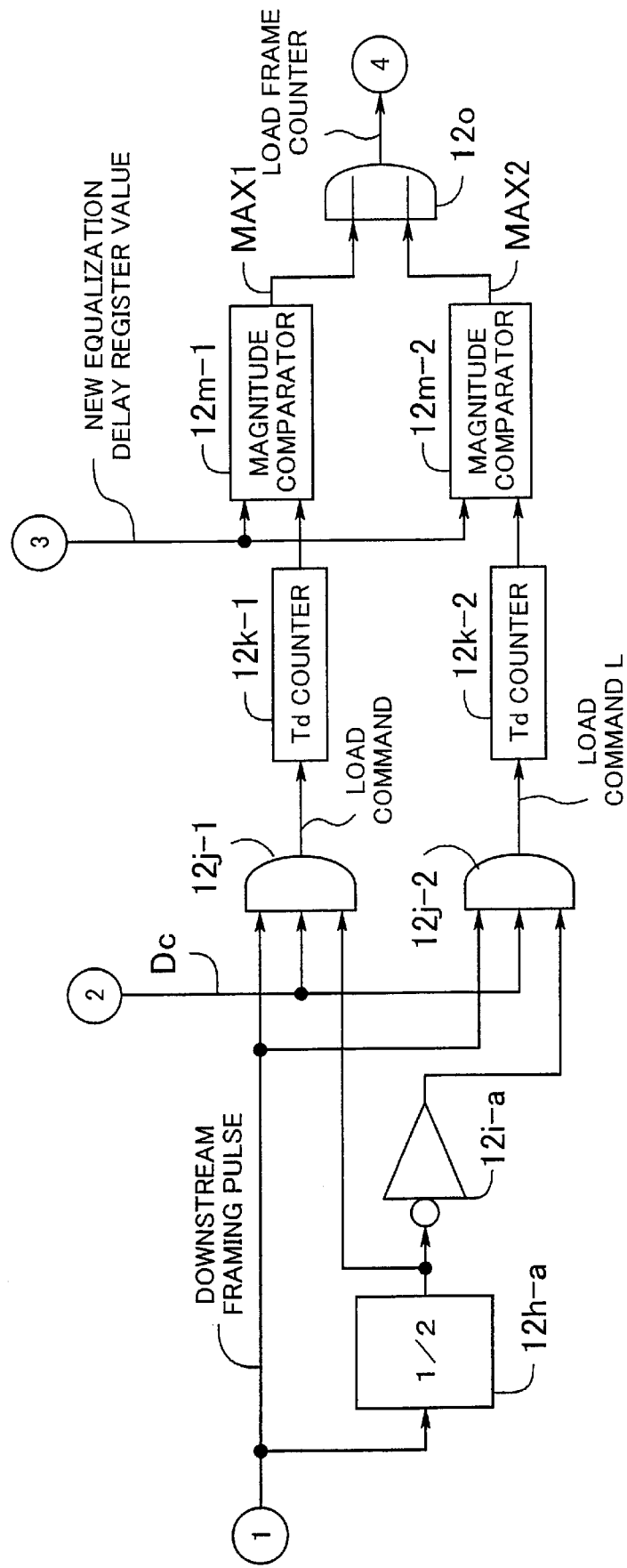
FIG. 8 is a diagram which shows the structure of a delay adjustment controller that supports upstream cell delays up to two frame intervals.

FIG. 8 presents a specific case of the structure shown in FIG. 7 in which the number of frames is just two, or n=2. FIG. 6 also applies to this case, since it is a common structure independent of the number n. As a whole, the delay adjustment controller 12 of FIGS. 6 and 8 can produce upstream cell delays up to two frame intervals. The circuit of FIG. 8, which is specific to the n=2 configuration, operates as follows.

Being configured as a 1-bit binary counter, a divide-by-2 circuit (½ divider) 12h–a divides the downstream framing pulses (1) by two, and its inverted output is produced by an inverter 12i–a. An AND gate 12j-1 receives the downstream framing pulse signal (1), the comparison result signal Dc (2), and the non-inverted divider output signal. Another AND gate 12j-2 receives the inverted divider output signal in addition to the former two signals. The outputs of those AND gates 12j-1 and 12j2 are supplied to Td counters 12k-1 and 12k-2 to drive their load command inputs. Magnitude comparators 12m-1 and 12m-2 compare the outputs of those Td counters 12k-1 and 12k-2 with the new equalization Td delay parameter (3). If the Td counter values agree with the parameter, they will assert high-active signals MAX1 and MAX2, respectively. These comparator outputs MAX1 and MAX2 are then supplied to an OR gate 12o, where they are ORed into a frame counter load command signal (4).

Figure 9:
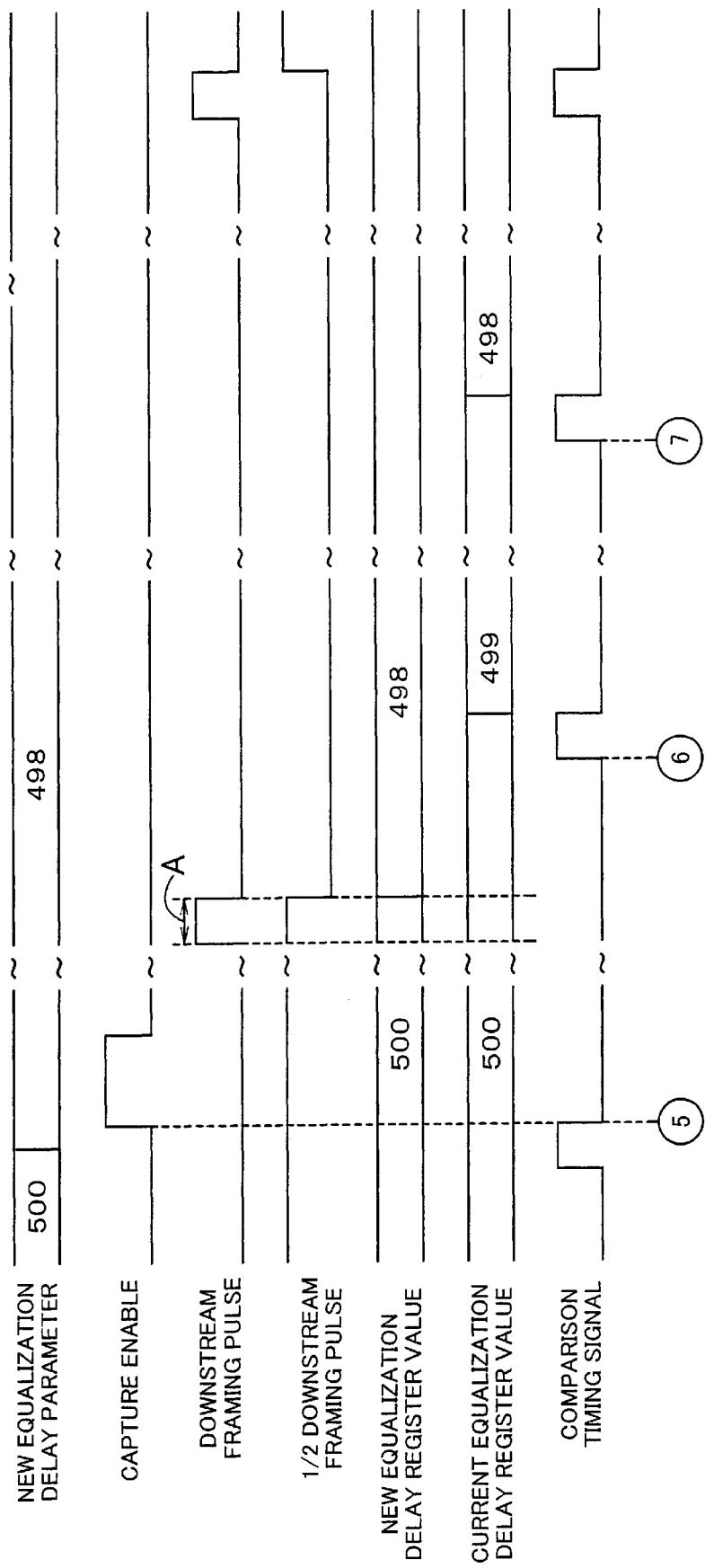
FIGS. 9 and 10 are timing diagrams showing how the delay adjustment controller operates.

Referring next to a timing diagram of FIGS. 9 and 10, a typical operation of the above-described delay adjustment controller 12 will be described below. As previously noted, the delay adjustment controller 12 supports upstream cell delays up to two frames (i.e., n=2), and it is assumed here that the OLT has commanded the ONU 10 to change its equalization delay from 500 to 498, meaning that the upstream cell delay should be reduced by two bits. This command produces the following condition in the circuit shown in FIG. 6.

current equalization delay parameter=500
new equalization delay parameter=498
current equalization delay>new equalization delay Referring to FIG. 9, the delay adjustment controller 12 acquires the new value "498" of the equalization delay parameter at the timing of the capture enable signal. Downstream framing pulses, each of which indicates the beginning of a downstream frame and triggers upstream cell transmission, are divided by the ½ divider 12h–a. As seen in FIG. 9, this divided signal alternates each time a downstream framing pulse is received. New equalization delay register value shows the output of the new equalization delay register 12b. FIG. 9 shows that this register 12b is loaded with the new equalization delay parameter "498" at the falling edge of the first downstream framing pulse. Current equalization delay register value shows the output of the current qualization delay register 12c, which holds the current value "500" for a while. Comparison timing signal indicates the top of each upstream cell that is timed by the frame counter 12g.

Figure 10:
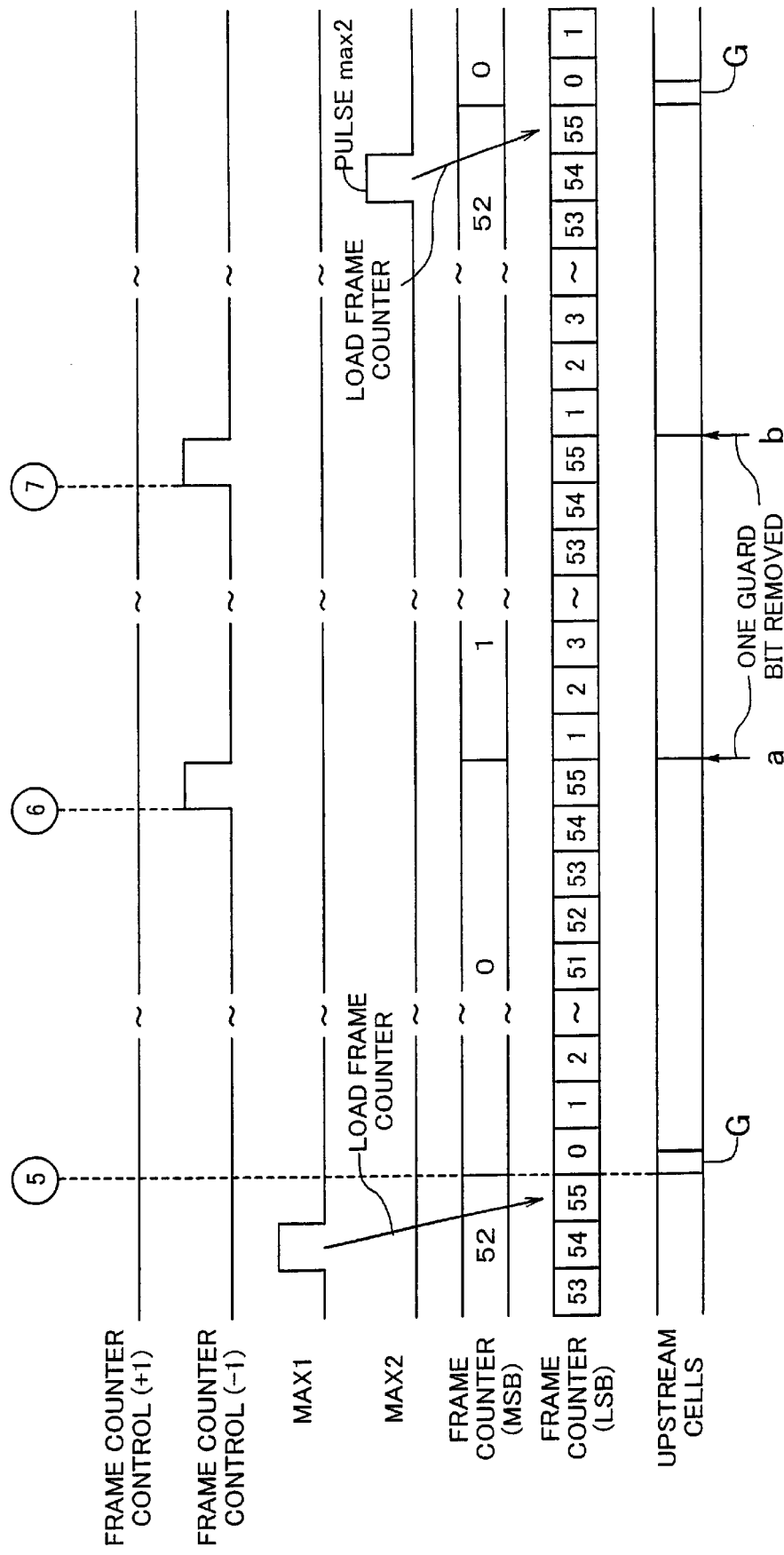

Referring to FIG. 10, the Td counters 12k-1 and 12k-2 alternately reach the maximum value, resulting in the assertion of signals MAX1 and MAX2. Notice the pulse labeled "max2" in FIG. 10, for instance. This pulse indicates that the Td counter 12k-2 has reached the MAX value after counting the time since its load command input signal L was asserted last time. Actually, the last load signal L was produced as the logical product of the downstream framing pulse, the divided downstream framing pulse signal, and the comparison result signal Dc, which all exhibit "high" levels during the period "A" shown in FIG. 9. Referring back to FIG. 10, the frame counter (MSB) shows the value of the most significant part of the frame counter 12g, which indicates which upstream cell is being transmitted. The frame counter (MSB) counts upstream cells, from 0 to 52, after being initialized by the signal MAX1 or MAX2.

The equalization delay comparator 12d, on the other hand, makes its first comparison output Da active, or "high," because of the new equalization delay parameter "500." This comparison result signal Da, along with the subsequent comparison timing signal, makes the AND gate 12e output a high level, which is shown in FIG. 10 as the first pulse of the frame counter control (−1) signal. Needless to say, the other AND gate 12f stays inactive at this time, since the second comparison result signal Db is "low".

Referring again to FIG. 10, the frame counter (LSB) shows the value of the least significant part of the frame counter 12g, indicating which byte in a 56-byte upstream cell is being transmitted. While the frame counter (LSB) normally counts up from 0 to 55, its count value returns to "1," instead of "0," when the frame counter control (−1) signal is active. In the present example, the frame counter 12g receives this control signal twice, thus changing the counter value from "55" to "1," skipping "0" at time points "a" and "b." The values of this frame counter (LSB) are used as the read address of the FIFO 12p.

Each upstream cell consists of a series of bits, including guard bits G and other data bits. FIG. 10 shows this bit stream in a simplified manner. When the frame counter (LSB) skips the value of "0," one guard bit G is removed from the bit stream. In the present example, this guard bit removal happens at two time points "a" and "b." At those two time points, the current equalization delay register 12c is decremented by one, because the comparison result signals of the equalization delay comparator 12d are fed back to it. In the present case, the current equalization delay register value decreases from "500" to "499," and then to the final value of "498" as shown in FIG. 9.

Figure 11:
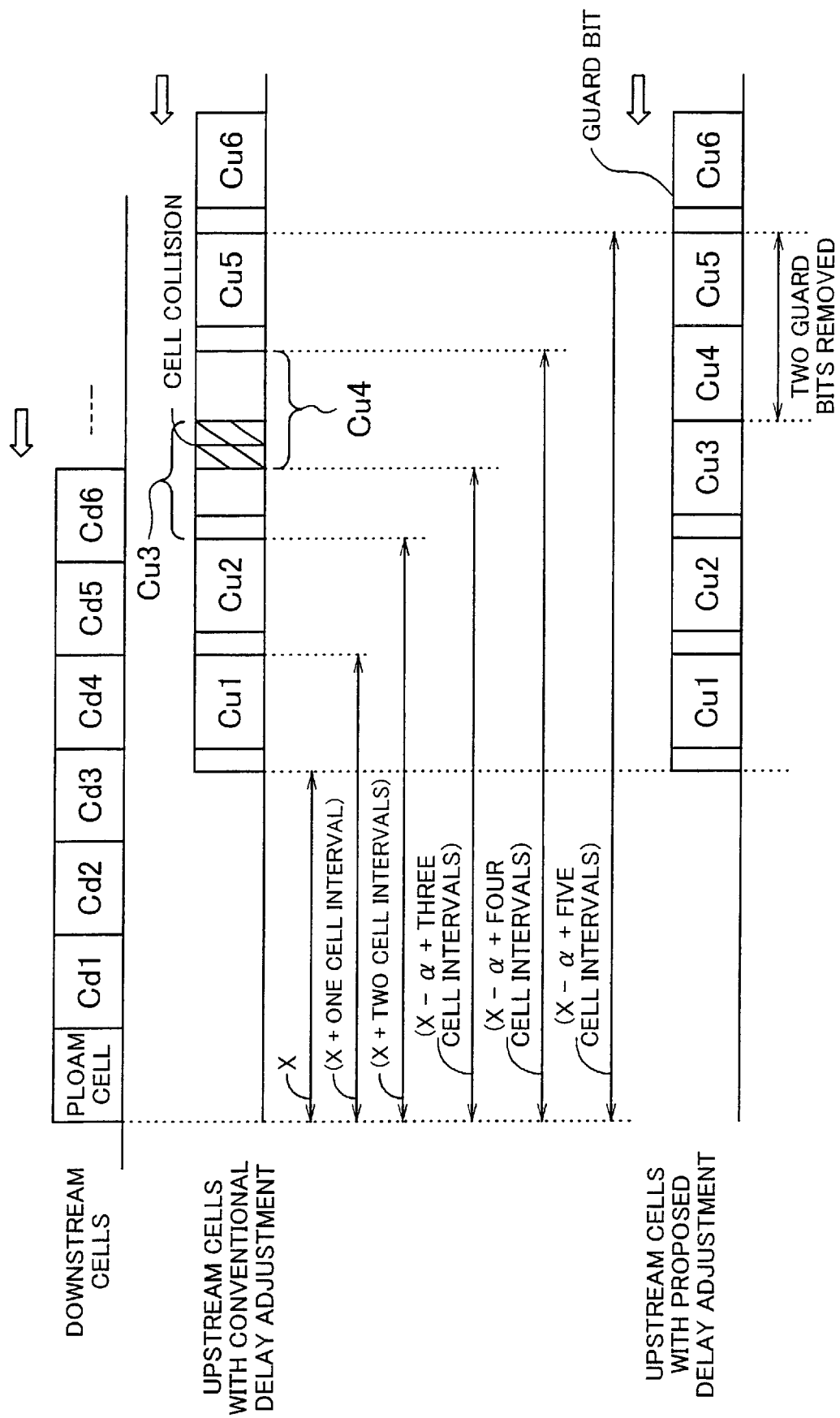
FIG. 11 is a diagram which schematically shows how the proposed delay adjustment controller handles a decreased equalization delay parameter.

FIG. 11 schematically shows the result of delay adjustment with a decreased equalization delay parameter, assuming that the OLT requests the ONU 10 to update the upstream cell delay from X to (X−α). Note that, in FIG. 11, the hatched part of each upstream cell is the first guard bit, and that the upstream time slots of cells Cu1 to Cu6 are granted to the ONU 10.

The first upstream cell Cu1 appears after a delay time X, with respect to the beginning of the downstream frame. Likewise, the second upstream cell Cu2 is transmitted after a delay time of (X+one cell interval), and the third upstream cell Cu3 after a delay time of (X+two cell intervals). The new equalization delay parameter now takes effect, and the upstream cell delay is reduced from X to (X−α), which could cause a collision between Cu3 and Cu4 in a conventional ONU. According to the present invention, however, the phase shift α in question is absorbed by the removal of two guard bits, one from Cu4 and the other from Cu5. As a result, the sixth upstream cell Cu6 with a normal guard bit appears after a delay time of (X−α+5 cell intervals), without disrupting any other cells. While some guard bits are removed from Cu4 and Cu5, the effective part of their data contents can be successfully delivered to the OLT.

As explained above, the proposed ONU 10 adjusts the timing of upstream cells by gradually shifting their phase on a bit-by-bit basis over a plurality of cell time slots. This feature permits the ONU 10 to make effective delay adjustments without disrupting data transmission during system operations, which enables higher-quality services.

Figure 12:
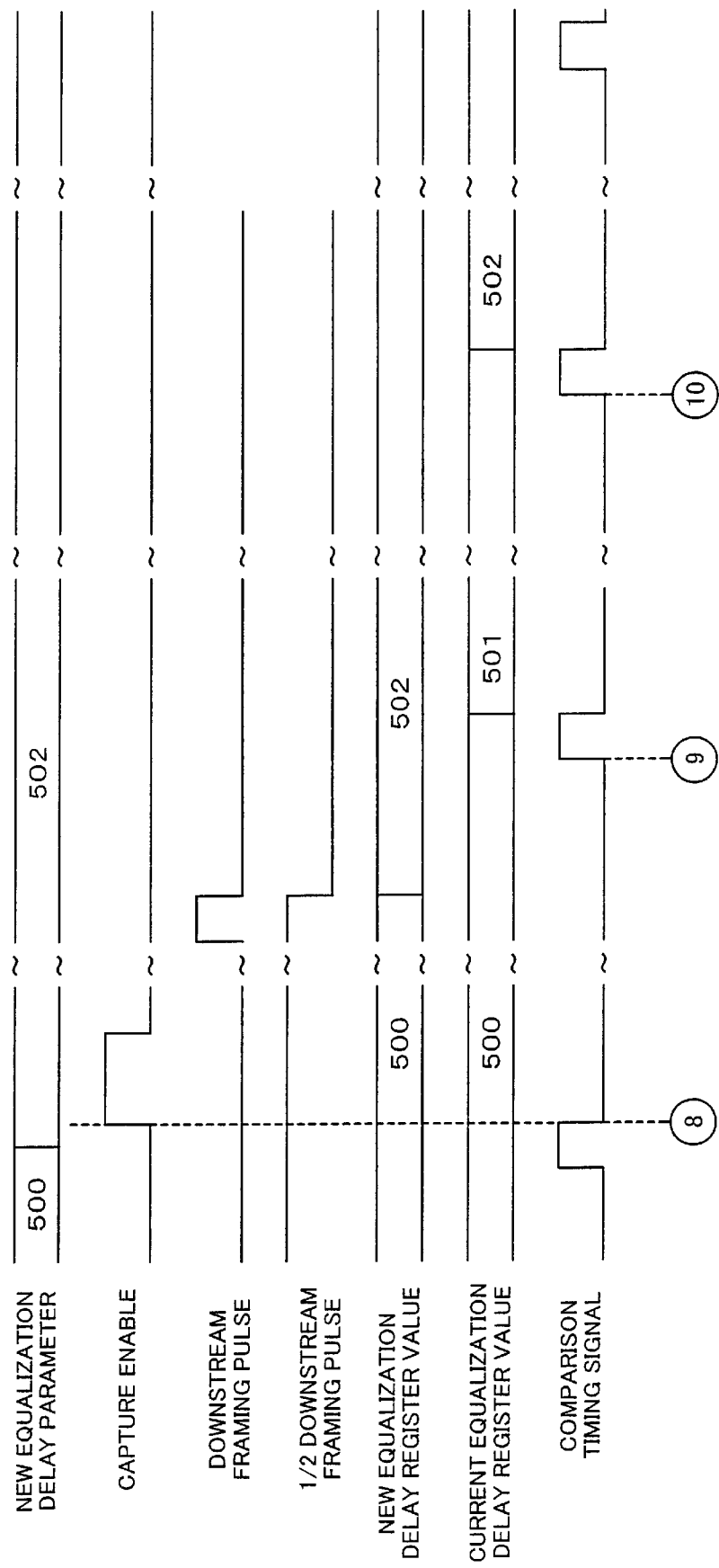
FIGS. 12 and 13 are timing diagrams showing how the delay adjustment controller handles an increased equalization delay parameter.
Figure 13:
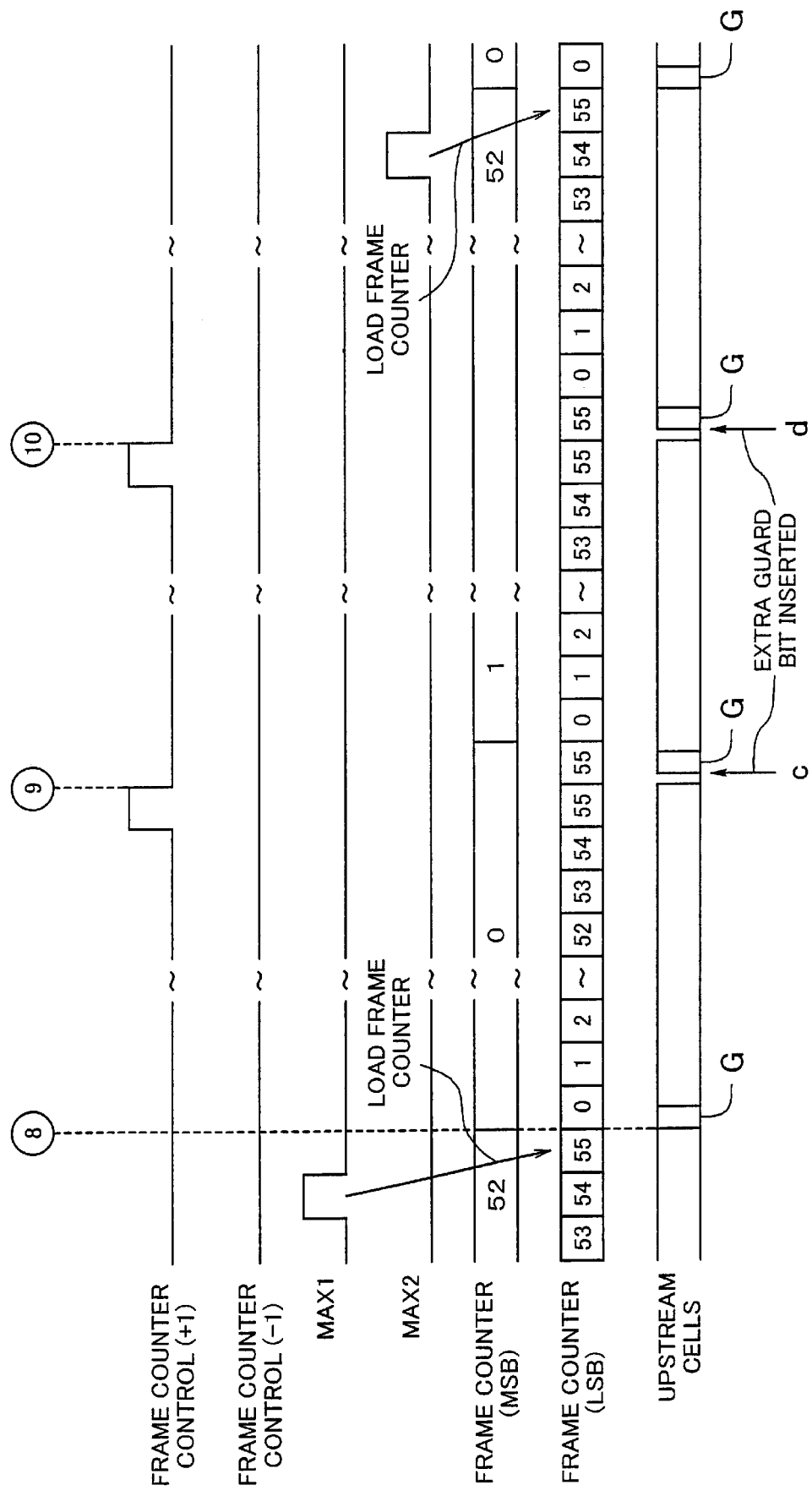

Referring to timing diagrams of FIGS. 12 and 13, the next section will describe how the delay adjustment controller 12 handles an increased equalization delay parameter. It is assumed here that the delay adjustment controller 12 supports upstream cell delays up to two frames, and that the OLT has commanded the ONU 10 to change its equalization delay from 500 to 502, meaning that the upstream cell delay should be increased by two bits. The above command produces the following condition in the circuit shown in FIG. 6.

current equalization delay parameter=500
new equalization delay parameter=502
current equalization delay<new equalization delay Since FIGS. 12 and 13 are organized in the same way as the FIGS. 9 and 10, the following explanation will focus on the difference between those two sets of timing diagrams.

Referring first to FIG. 12, the new equalization delay register value changes from "500" to "502" at the falling edge of the downstream framing pulse. The equalization delay comparator 12d, on the other hand, makes its second comparison output Db active, or "high." This comparison signal Db, together with the subsequent comparison timing signal, causes the AND gate 12f to drive its output to "high." This reaction is shown in FIG. 13 as two consecutive pulses of the frame counter control (+1) signal. Needless to say, the frame counter control (−1) signal stays inactive at this time, since the comparison result signal Da is "low". Note that, after reaching the final count "55," the frame counter (LSB) exhibits the same value "55" because the frame counter 12g receives the frame counter control (+1) signal. This happens twice at time points "c" and "d." The values of this frame counter (LSB) are used as the read address of the FIFO 12p.

When the frame counter (LSB) repeats the value of "55," the delay adjustment controller 12 inserts one extra guard bit G into the outgoing bit stream. In the present example, this guard bit insertion occurs at the time points "c" and "d." On the other hand, the current equalization delay register 12c is incremented by one, because the comparison result signals of the equalization delay comparator 12d are fed back to it. In the present case, the current equalization delay register value gradually increases from "500" to "501," and then to the final value of "502" as shown in FIG. 12.

As explained above, the proposed delay adjustment controller 12 adjusts the timing of upstream cells by inserting an additional guard bit when it receives a new equalization delay parameter that is greater than the current equalization delay. This arrangement permits the ONU to efficiently adjust the cell delay without disrupting data transport, thus improving the quality of data transmission services.

The above-described delay adjustment controller 12 can be implemented as a stand-alone device. This delay adjustment unit may comprise the following element: a reception unit which receives information including delay parameter; a delay adjustment controller which controls the delay time of data blocks to be transmitted in a bitwise manner, based on the received delay parameter; and a transmission unit which transmits the data blocks whose delay time has been adjusted. More specifically, the reception unit corresponds to a collection of registers shown in FIG. 6. The transmission means corresponds to the FIFO 12p. The delay adjustment controller corresponds to the other circuit components shown in FIG. 6. Since the operation of this circuit has already been described in FIG. 6, no further details are provided here. The proposed stand-alone version of a delay adjustment unit is advantageous in its versatility and flexibility, being suitable for use with other equipment that requires delay adjustment capabilities.

The concept of delay adjustment control has been explained above, assuming that the whole circuit operates at 155.52 MHz on a serial basis. In actuality, however, most part of the circuit operates at a slower clock frequency (more specifically, 155.52/8 MHz). After being processed in a parallel manner, the upstream data is multiplexed in the time domain and then sent out as a serial bit stream.

The next section will describe how the delay adjustment controller 12 produces a bitwise cell delay, focusing on the structure and operations of the parallel-to-serial (P/S) controller 120.

Figure 14:
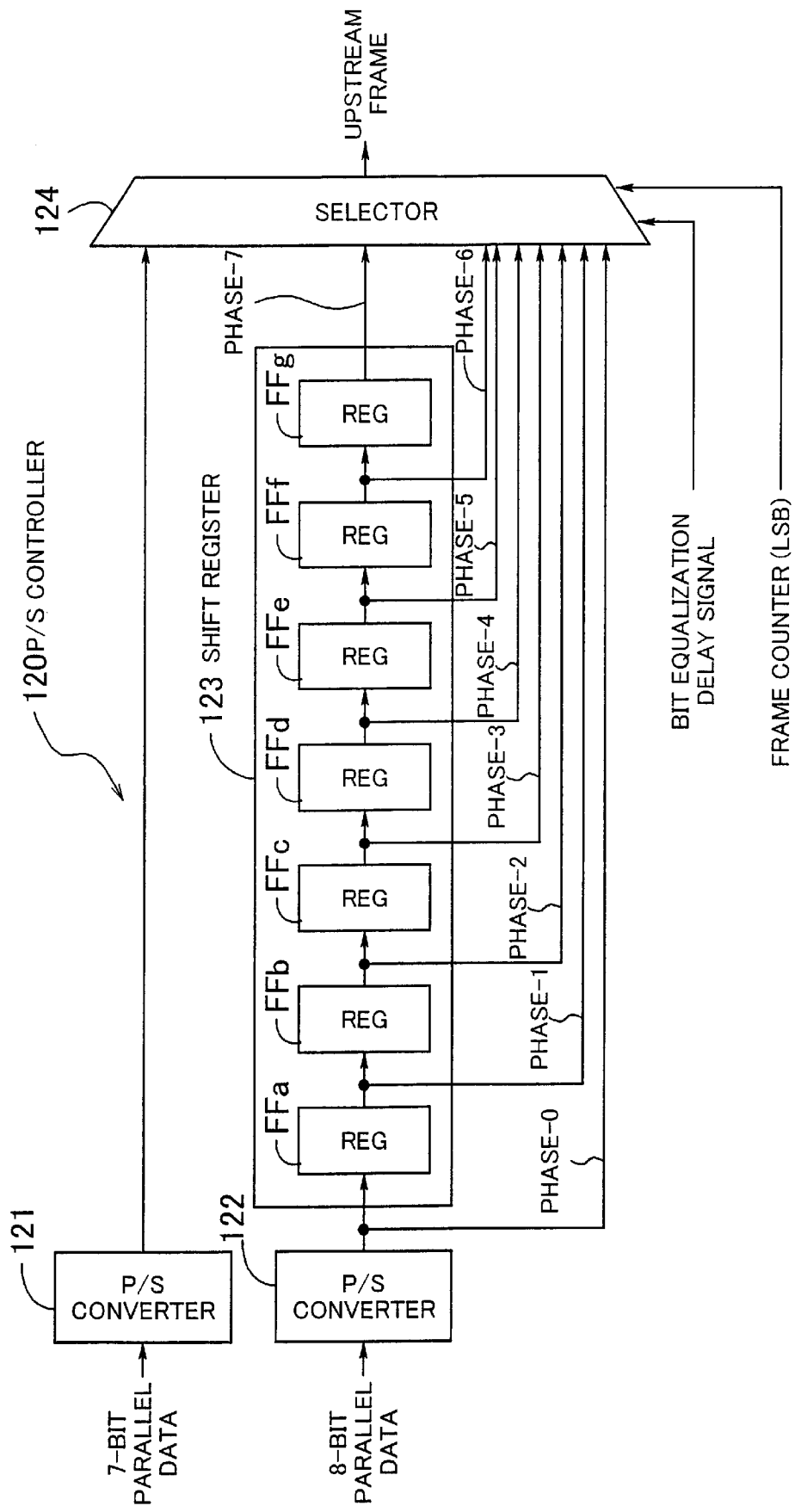
FIG. 14 is a diagram showing the structure of a P/S controller.

FIG. 14 shows the structure of the P/S controller 120, which is disposed next to the FIFO 12p shown in FIG. 6. The P/S controller 120 comprises two P/S converters 121 and 122. The FIFO 12p supplies the P/S converter 121 with its output data bits #0 to #6, or 7-bit wide parallel data. The P/S converter 121 converts this 7-bit parallel data into a serial bit stream. The FIFO 12p also supplies a P/S converter 122 with its output data bits #0 to #7, or 8-bit wide parallel data. The P/S converter 122 converts this 8-bit parallel data into a serial bit stream and then feeds the output to a shift register 123. This shift register 123 comprises seven registers FFa to FFg connected in series. The input to the first register FFa is referred to herein as the "phase-0 data signal," and the its output is called the "phase-1 data signal. Likewise, the outputs of the other registers FFb to FFg are referred to as the phase-2 to phase-7 data signals.

A selector 124 selects one of its nine input signals including one serial bit stream from the P/S converter 121 and eight out-of-phase data signals, from phase-0 to phase-7. The selector 124 outputs the selected signal as the upstream data. The frame counter (LSB) signals, together with a bit delay adjustment signal, are used to control the selection. The frame counter (LSB) signals are read address signals produced by the frame counter 12g, which counts the bytes #0 to #55 of an upstream cell as explained in FIG. 6. The bit delay adjustment signal, on the other hand, is a 3-bit code that the current equalization delay register 12c (FIG. 6) produces according to the current equalization delay parameter, specifying which one of the phase-0 to phase-7 signals should be selected.

Figure 15:
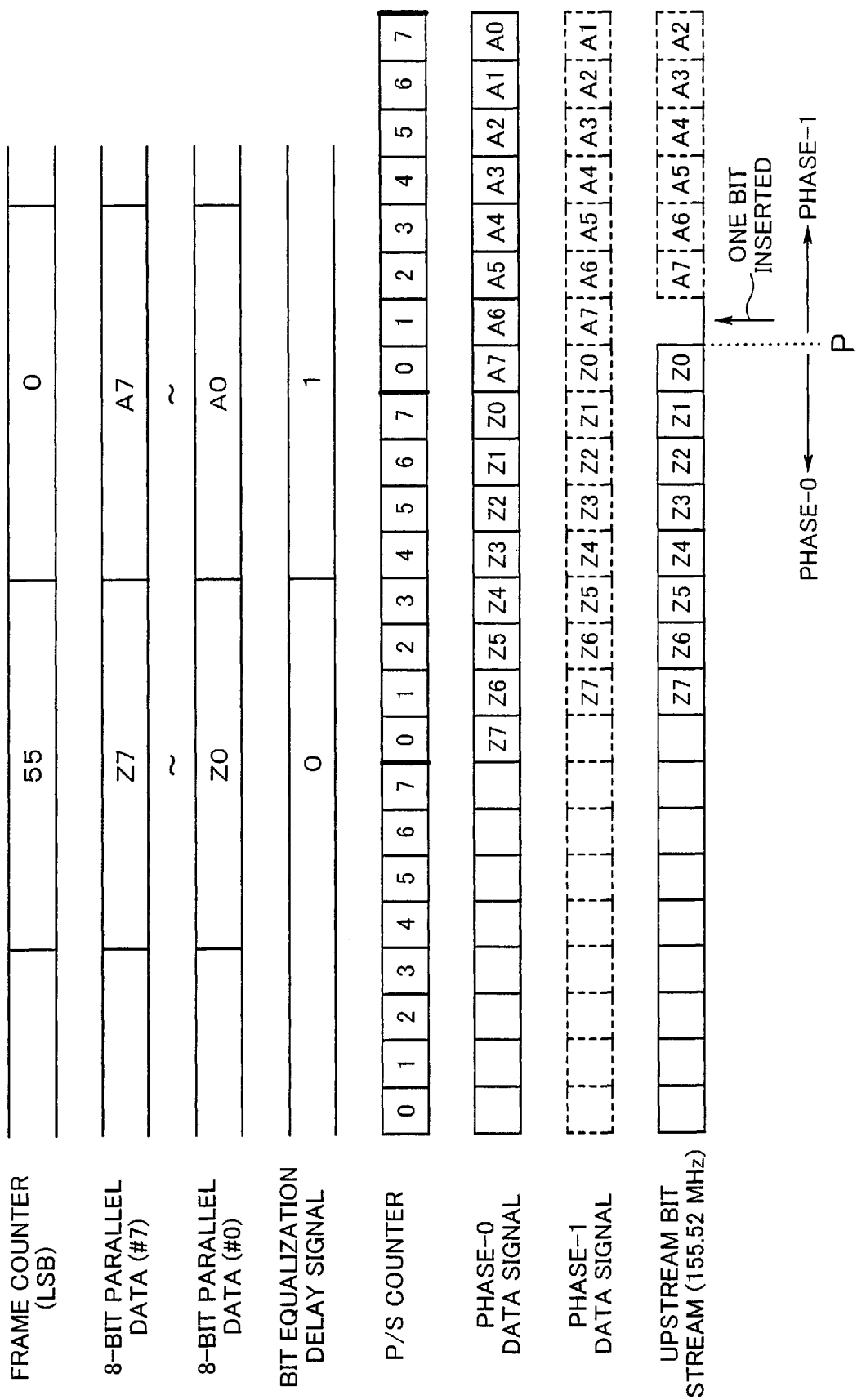
FIGS. 15 to 18 are timing diagrams showing typical operations of the P/S controller.

The next section will describe how the P/S controller 120 operates. FIG. 15 is a timing diagram showing a typical parallel to serial conversion, in which the upstream cell delay is adjusted from phase-0 to phase-1 by inserting one additional guard bit. When the frame counter (LSB) value changes from "55" to "0," the 8-bit parallel data bits #0 to #7 vary from "Z0–Z7" to "A0–A7," and the bit delay adjustment signal changes from "0" to "1." Every given 8-bit parallel data is converted to a serial bit stream, according to the count values of a P/S counter. More specifically, bit Z7 appears on the phase-0 data signal when the P/S counter is "0." Likewise, bit Z6 appears when the P/S counter is "1." The phase-1 data signal has a delay of one bit interval, relative to the phase-0 data signal. The above-described signals, except or the P/S counter values, are supplied to the selector 124. In the present case, the bit delay adjustment signal is retimed within the selector 124 so that it will take effect at the time point P. The phase-0 and phase-1 data signals are also retimed in the selector 124. After all, the selector 124 changes its selection from phase-0 to phase-1 at the time point P shown in FIG. 15, thus producing a 155.52 MHz upstream signal with an extra guard bit inserted.

Figure 16:
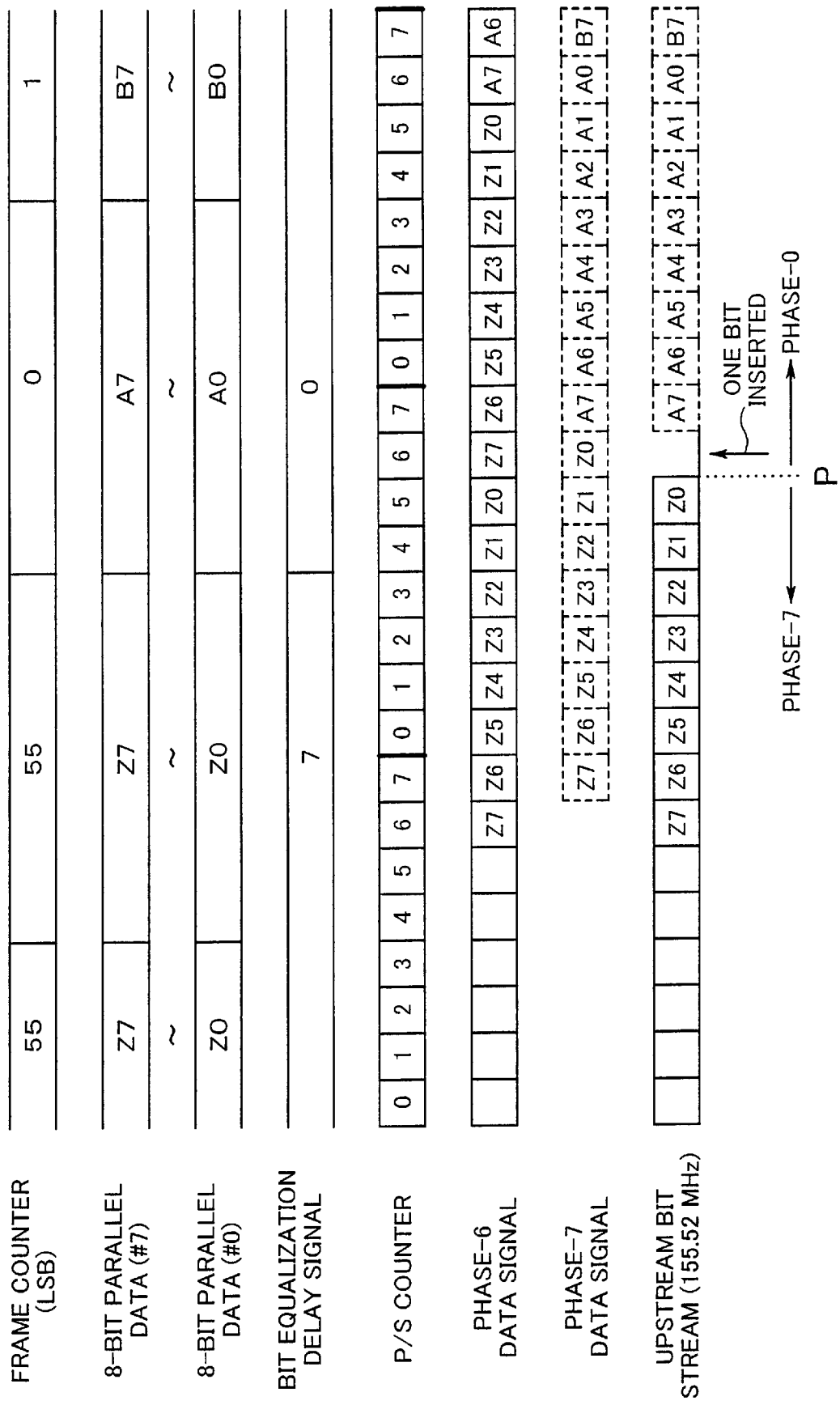

FIG. 16 is a timing diagram showing another example of parallel to serial conversion, where the upstream cell delay is adjusted from phase-7 to phase-0 by inserting one additional guard bit. This transition from phase-7 to phase-0 requires the selector 124 to perform a phase adjustment, crossing the boundary between two consecutive bytes. That is, the selector 124 has to migrate from a certain byte with the largest delay to the next byte with the smallest delay. Actually, this operation can be interpreted as a single bit insertion for the following reason. Notice that the frame counter (LSB) outputs the final count value "55" in two consecutive cycles in this case, which has the effect of an 8-bit phase lag. The transition from phase-0 to phase-7, on the other hand, causes a 7-bit phase lead. As a whole, these phase lag and lead will cancel out each other, thus resulting in only one bit lag. Therefore, the operation of the selector 124 in this case can be explained analogously to the migration from phase-6 to phase-7.

When the frame counter (LSB) value changes from "55" to "0," the 8-bit parallel data bits #0 to #7 vary from "Z0–Z7" to "A0–A7," and the bit delay adjustment signal changes from "7" to "0." The P/S converter 122 converts every given 8-bit parallel data into a serial bit stream according to the count values of the P/S counter, thus outputting phase-6 and phase-7 data signals as shown in FIG. 16.

The above signals, except for the P/S counter values, are then supplied to the selector 124. In the present case, the bit delay adjustment signal is retimed within the selector 124 so that it will take effect at the time point P. Consequently, the selector 124 switches the data from phase-7 to phase-0 (or from phase-6 to phase-7) at the time point P shown in FIG. 16, thus producing a 155.52 MHz upstream signal with an extra guard bit inserted.

Figure 17:
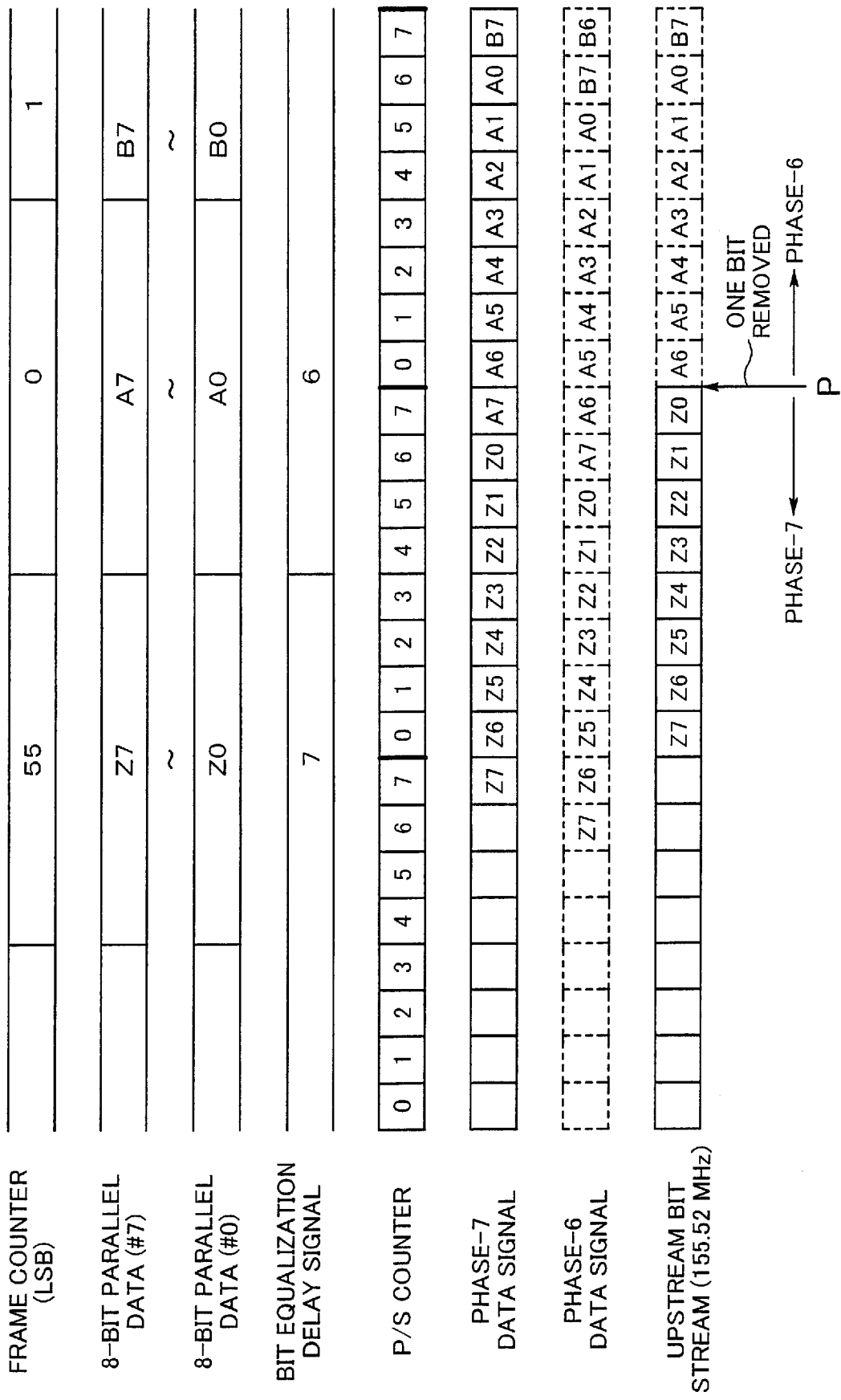

FIG. 17 is a timing diagram showing still another example of parallel to serial conversion, where the upstream cell delay is adjusted from phase-7 to phase-6 by removing one guard bit. When the frame counter (LSB) value changes from "55" to "0," the 8-bit parallel data bits #0 to #7 vary from "Z0–Z7" to "A0–A7," and the bit delay adjustment signal changes from "7" to "6." The P/S converter 122 converts every given 8-bit parallel data into a serial bit stream according to the count values of the P/S counter, thus outputting phase-6 and phase-7 data signals as shown in FIG. 17.

The above signals, except for the P/S counter values, are then supplied to the selector 124. The bit delay adjustment signal is retimed within the selector 124 so that it will take effect at the time point P. The phase-6 and phase-7 data signals are also retimed inside the selector 124. After all, the selector 124 switches the selection from phase-0 to phase-1 at the time point P shown in FIG. 15, thus producing a 155.52 MHz upstream signal with one guard bit removed.

Figure 18:
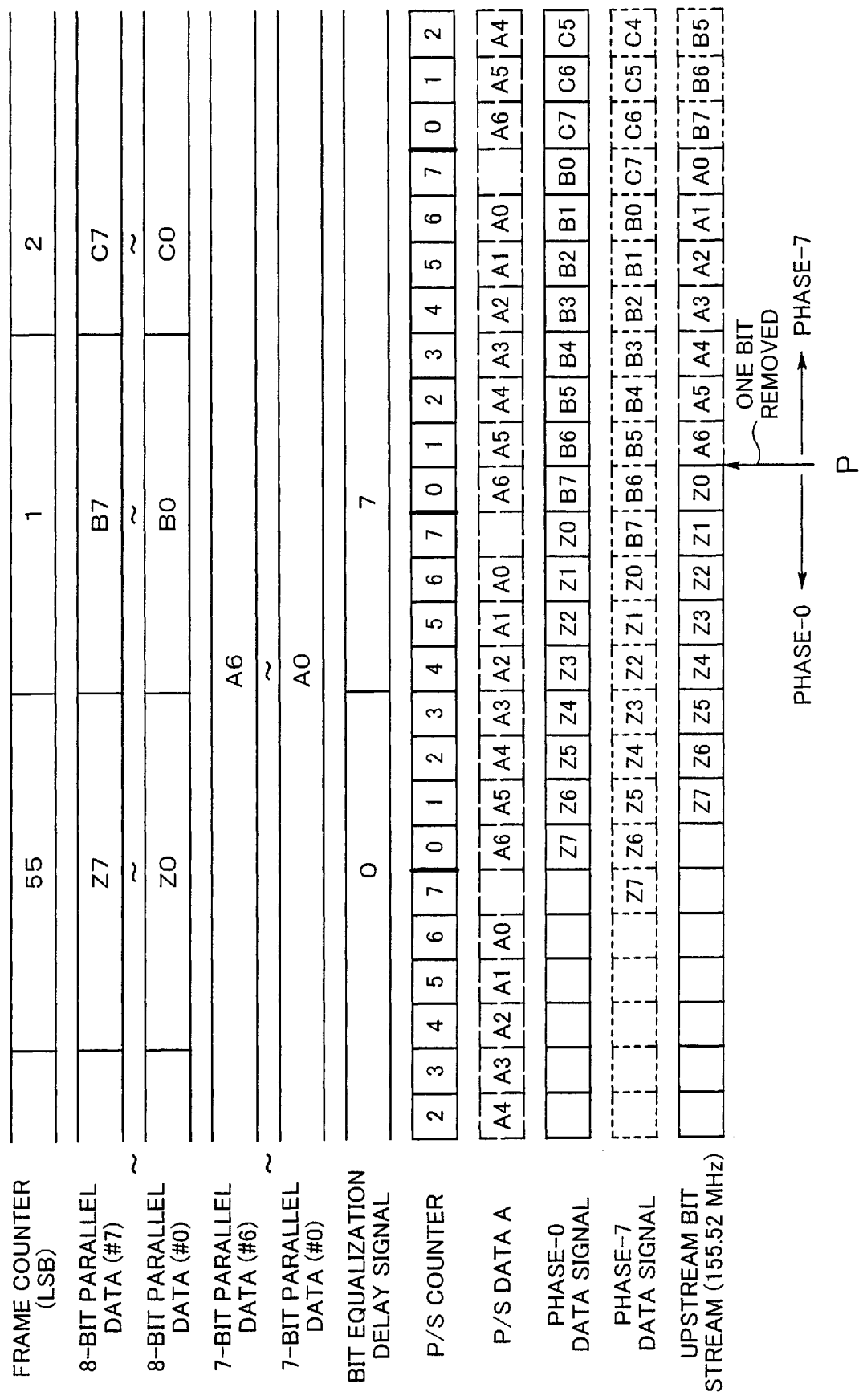

FIG. 18 is a timing diagram showing still another example of parallel to serial conversion, where the upstream cell delay is adjusted from phase-0 to phase-7 by removing one guard bit. This transition from phase-0 to phase-7 requires the selector 124 to perform a phase adjustment, crossing the boundary between two consecutive bytes. That is, the selector 124 has to migrate from a certain byte with the smallest delay to the subsequent byte with the largest delay. Actually, this can be interpreted as a single bit removal for the following reason. Notice that the frame counter (LSB) does not output the first count value "0" in this case, which has the effect of an 8-bit phase lead. The transition from phase-7 to phase-0, on the other hand, causes a 7-bit phase lag. As a whole, these phase lag and lead cancel out each other, thus resulting in only one bit lead.

When the frame counter (LSB) value changes from "55" to "1," the 8-bit parallel data bits #0 to #7 vary from "Z0–Z7" to "B0–B7," and the bit delay adjustment signal changes from "0" to "7." In this case, the lack of the first counter value "0" necessitates the use of serialized 7-bit parallel data signals A0 to A6. They are the output of the P/S converter 121 explained in FIG. 14. The most significant bit A7 is not necessary because it is to be removed anyway.

The P/S converter 122 converts every given 8-bit parallel data into a serial bit stream according to the count values of the P/S counter. The 7-bit parallel data A0 to A6 and the phase-0 and phase-7 data signals are provided as shown in FIG. 18.

The above signals, except for the P/S counter values, are then supplied to the selector 124. The bit delay adjustment signal is retimed within the selector 124, so that it will take effect at the time point P. The phase-6 and phase-7 data signals are also retimed inside the selector 124. The selector 124 switches its selection from phase-0 to phase-7 at the time point P shown in FIG. 15, thus producing a 155.52 MHz upstream signal with one guard bit removed.

Referring now to FIGS. 19 to 23, the next section will describe the clock phase controller 14 of the present invention.

The ONU 10 has a clock oscillator (PLO) operating at 155.52 MHz for upstream data transmission. For delay adjustment purposes, it is necessary to implement a mechanism for timing resynchronization from downstream to upstream. The ONU 10 achieves this with a slower clock produced by dividing the PLO clock. The clock phase controller 14 is responsible to adjust the phase relationships between the following two divided clocks: one originated from the downstream clock (155.52 MHz), and the other originated from the upstream PLO clock. This clock phase adjustment is performed in a bitwise manner while the equalization delay is stable.

Figure 19:
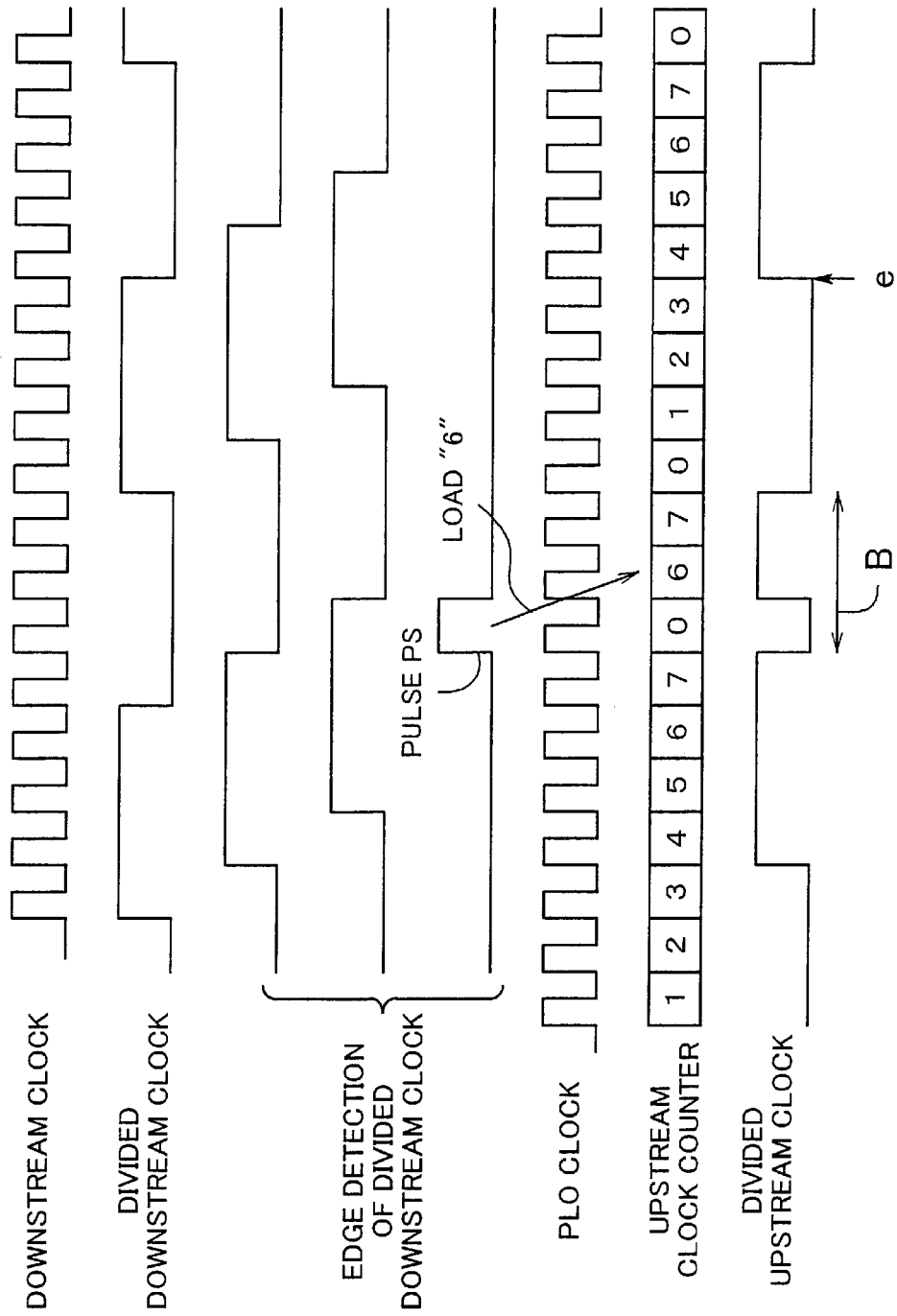
FIG. 19 is a timing diagram which shows conventional clock phase adjustment.

FIG. 19 is a timing diagram showing a conventional clock phase adjustment method, which is designed to synchronize the upstream and downstream clocks in such a way that their respective divided clock signals will be 180-degree out of phase with each other.

The divided downstream clock signal is generated by dividing the downstream transmission clock signal by eight. The divided downstream clock signal is then successively shifted by one transmission clock cycle for the purpose of edge detection. Pulse "PS" indicates a falling edge of the divided downstream clock detected in this way. There is another counter operating with the PLO clock signal to produce a divided upstream clock, whose count value increases from "0" to "7" accordingly. The pulse PS is now used to load a value of "6" to this upstream clock counter as indicated by the directional arrow in FIG. 19. This operation gives a certain amount of phase shift to the divided upstream clock signal, resulting in a 180-degree out-of-phase state, with respect to the divided downstream clock signal, at the time point e. The conventional method, however, has a problem in that the resultant divided clock signal is significantly deformed during the transient period of "B" because the counter is forcibly loaded with the value of "6." This waveform deformation could cause a malfunction in parallel-to-serial conversion, for example, during the period of "B."

FIG. 20 shows the structure of the clock phase controller 14 according to the present invention. A shift register 14a produces a plurality of signals by successively shifting a given divided (e.g., divided by eight) downstream clock signal by one transmission clock cycle for each. Those shifted signals can be handled as a code signal having eight different states. A decoder 14b decodes this code signal, within a specific period when the divided downstream clock changes from high to low, thereby producing several decoded signals. An upstream clock counter 14c counts the upstream transmission clock at constant intervals, while using the decoded signals to control its load timings. A divided upstream clock generator 14d, containing a PLO circuit, produces a divided upstream clock signal on the basis of the output of the upstream clock counter 14c.

Figure 21:
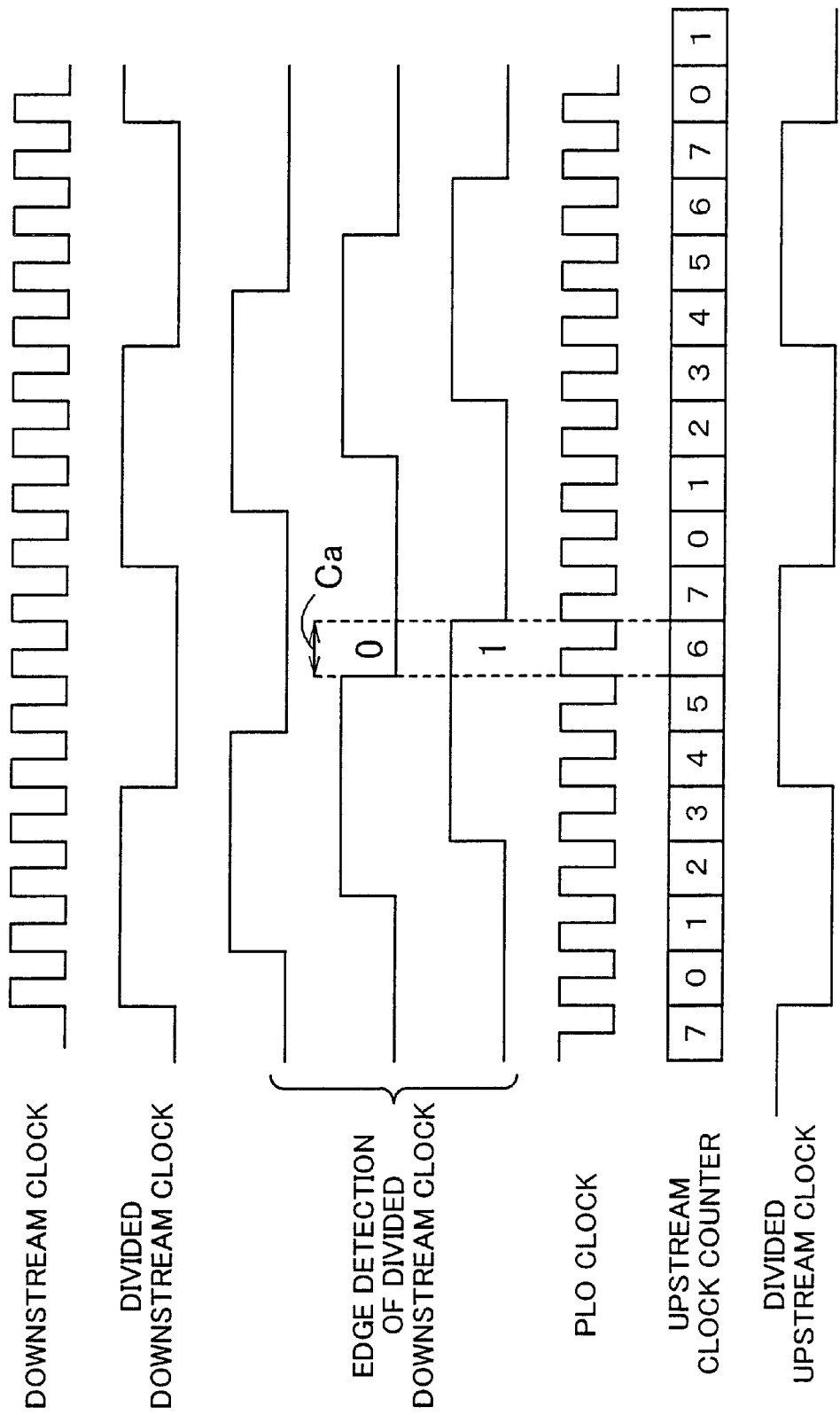
FIGS. 21 to 23 are timing diagrams which show how the proposed clock phase controller works.

FIG. 21 is a timing diagram which shows a typical operation of the proposed clock phase controller 14. Here, the divided downstream clock signal is generated by dividing the downstream transmission clock signal by eight. The divided downstream clock signal is then successively shifted by one downstream transmission clock cycle for the purpose of edge detection. FIG. 21 shows that the last two shifted signals exhibit "1" and "0," respectively, during a period Ca when the downstream clock counter value is "6." This is the normal state where the divided upstream clock signal is 180-degree out of phase with the divided downstream clock signal.

Figure 22:
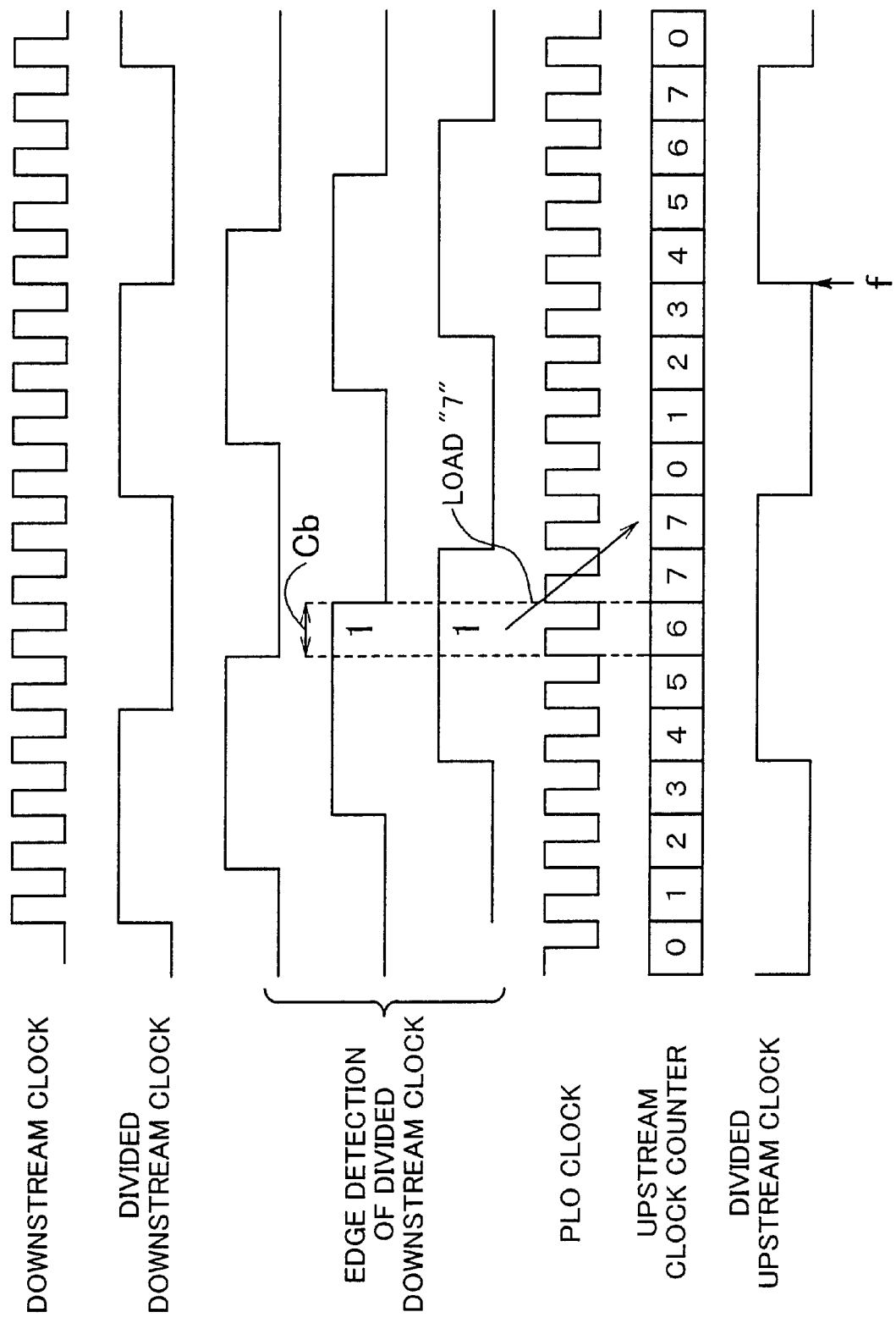

FIG. 22 is another timing diagram which shows the operation of the proposed clock phase controller 14, assuming that a 1-bit phase lead has happened to the upstream clock signal. The proposed clock phase controller 14 loads a value of "7" to the upstream clock counter if the two shifted signals show "1" and "1," respectively, during a period Cb when the count value is "6." In this way, the proposed clock phase controller 14 temporarily renders the divided upstream clock as a divided-by-nine signal during a specific period when a phase lead is observed, thereby regaining a 180-degree out-of-phase state with respect to the divided downstream clock signal, at the time point "f" and later.

Figure 23:
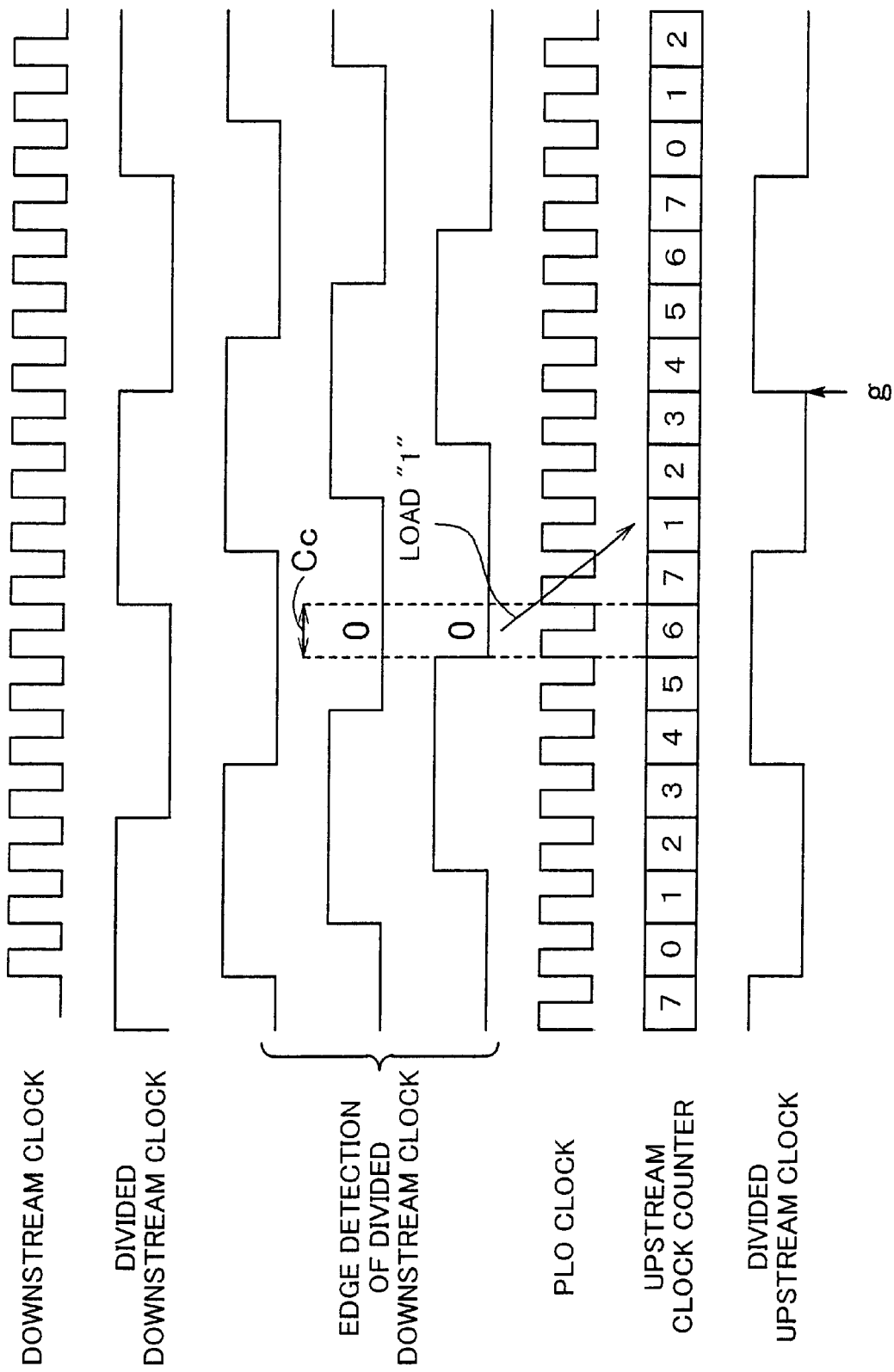

FIG. 23 is still another timing diagram which shows the operation of the proposed clock phase controller 14, assuming that a 1-bit phase lag has happened to the upstream clock signal. The proposed clock phase controller 14 loads a value of "1" to the upstream clock counter if the two shifted signals show "0" and "0," respectively, during a period Cc when the count value is "6." In this way, the proposed clock phase controller 14 temporarily renders the divided upstream clock as a divided-by-seven signal during a specific period when a phase lag is observed, thereby regaining a 180-degree out-of-phase state with respect to the divided downstream clock signal, at the time point "g" and later.

As described above, the proposed clock phase controller 14 is configured to adjust the upstream clock phase in a bit-by-bit manner to avoid any possible data disruption during the process of phase adjustment. When the divided upstream clock signal exhibits a phase lag or lead of two or more bits, the clock phase controller 14 shifts the clock phase by one bit at a time. Therefore, data can be correctly transported within the ONU 10, from its downstream portion to its upstream portion.

The next section will explain another aspect of the delay adjustment controller 12 in the proposed ONU 10. Recall that the delay adjustment controller 12 has been explained so far, assuming that the ONU 10 is transmitting an upstream cell at the time, as granted by the OLT, when an equalization delay update request is detected. In contrast to that, it is now assumed that the upstream cell time slot is not a granted time slot at the moment when the ONU 10 attempts to apply a new equalization delay parameter. According to the present invention, the new equalization delay parameter will be applied to the next granted cell time slot.

Figure 24:
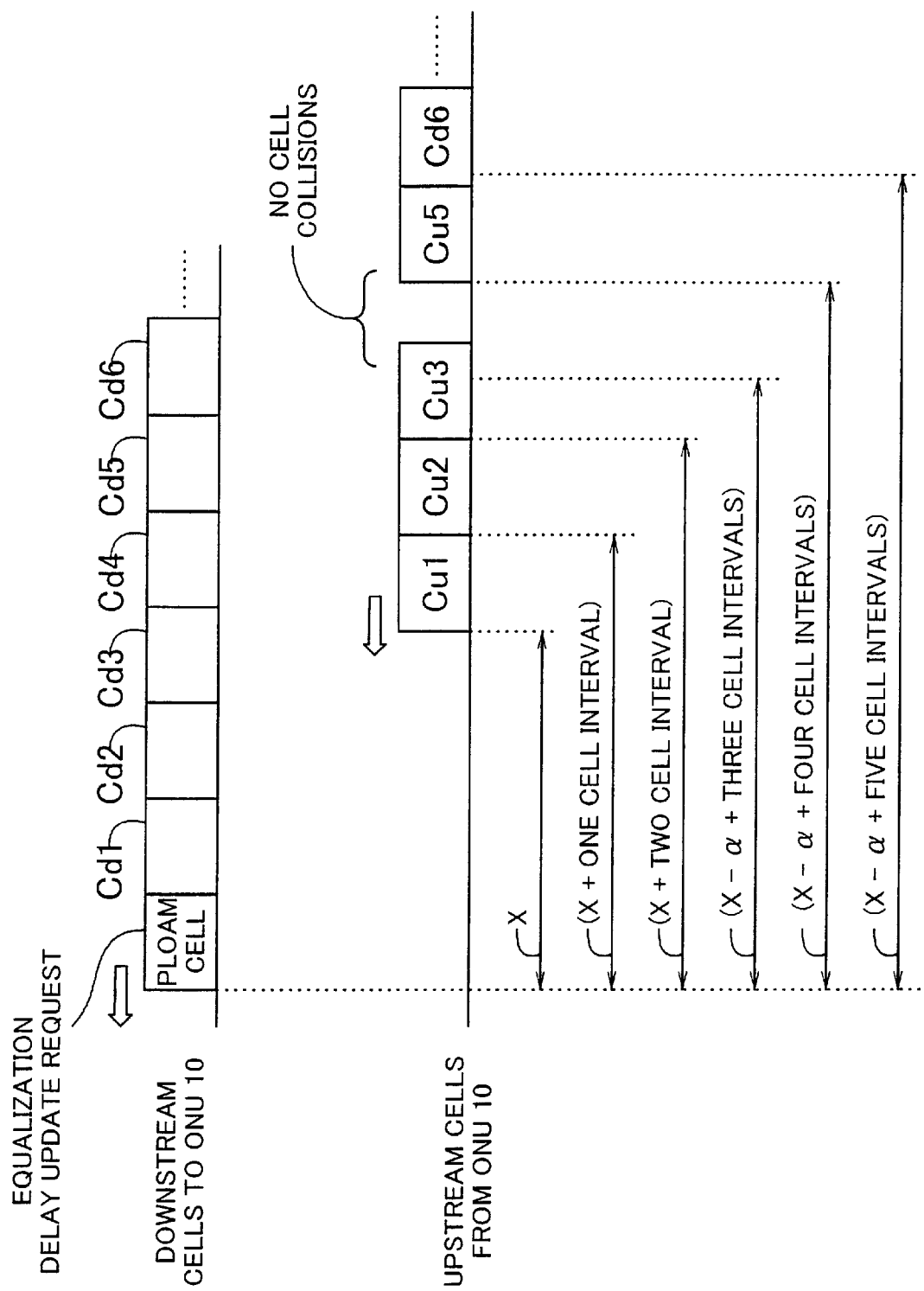
FIG. 24 is a diagram which explains how the proposed delay adjustment controller works.

FIG. 24 is a diagram which explains how the delay adjustment controller 12 operates. It is assumed, for example, that the downstream PLOAM cell contains grant information directed to the ONU 10, which describes that the ONU 10 can use upstream cell slots Cu1, Cu2, Cd3, Cu5, and Cd6. In addition, it is assumed that the PLOAM cell contained a new equalization delay parameter, and the ONU 10 has detected it during the upstream cell time slot Cu3.

In the above context, the delay adjustment controller 12 determines whether the time slot subsequent to Cu3 is granted to the ONU 10. Since the subsequent slot Cu4 is not granted to the ONU 10, the delay adjustment controller 12 activates the new equalization delay parameter from the next granted time slot Cu5. More specifically, the original delay time X applies to the first upstream cell Cu1, in reference to the beginning of the downstream frame. The second upstream cell Cu2 is transmitted with a delay time of (X+one cell interval), and the third upstream cell Cu3 with a delay time of (X+two cell intervals). In the case that the new equalization delay parameter is smaller than the current parameter, the upstream cell delay time should be reduced from X to (X−α) during the period of Cu4. With this reduced delay time, the ONU 10 begins transmission of the fifth upstream cell Cu5 after a delay time of (X−α+four cell intervals). After that, the ONU 10 transmits the sixth cell Cu6 with a delay time of (X−α+five cell intervals). In this way, the delay adjustment controller 12 activates the new equalization delay parameter from the first granted upstream cell after a non-granted upstream cell time slot has passed, thus preventing any granted cells (e.g., Cu3 and Cu5) from conflicting with each other during this transitional period.

As explained above, the proposed delay adjustment controller 12 adjusts the timing of upstream cells, depending on whether each subsequent upstream cell time slot is granted or not granted, when it has received an updated equalization delay parameter. If a non-granted slot is found, then the delay adjustment controller 12 activates the new parameter from the first granted upstream cell after that non-granted slot. This feature of the invention improves the quality of data transmission, since it permits the ONU 10 to send out its upstream cells without collisions even if the new equalization delay parameter is smaller than the current one.

Figure 25:
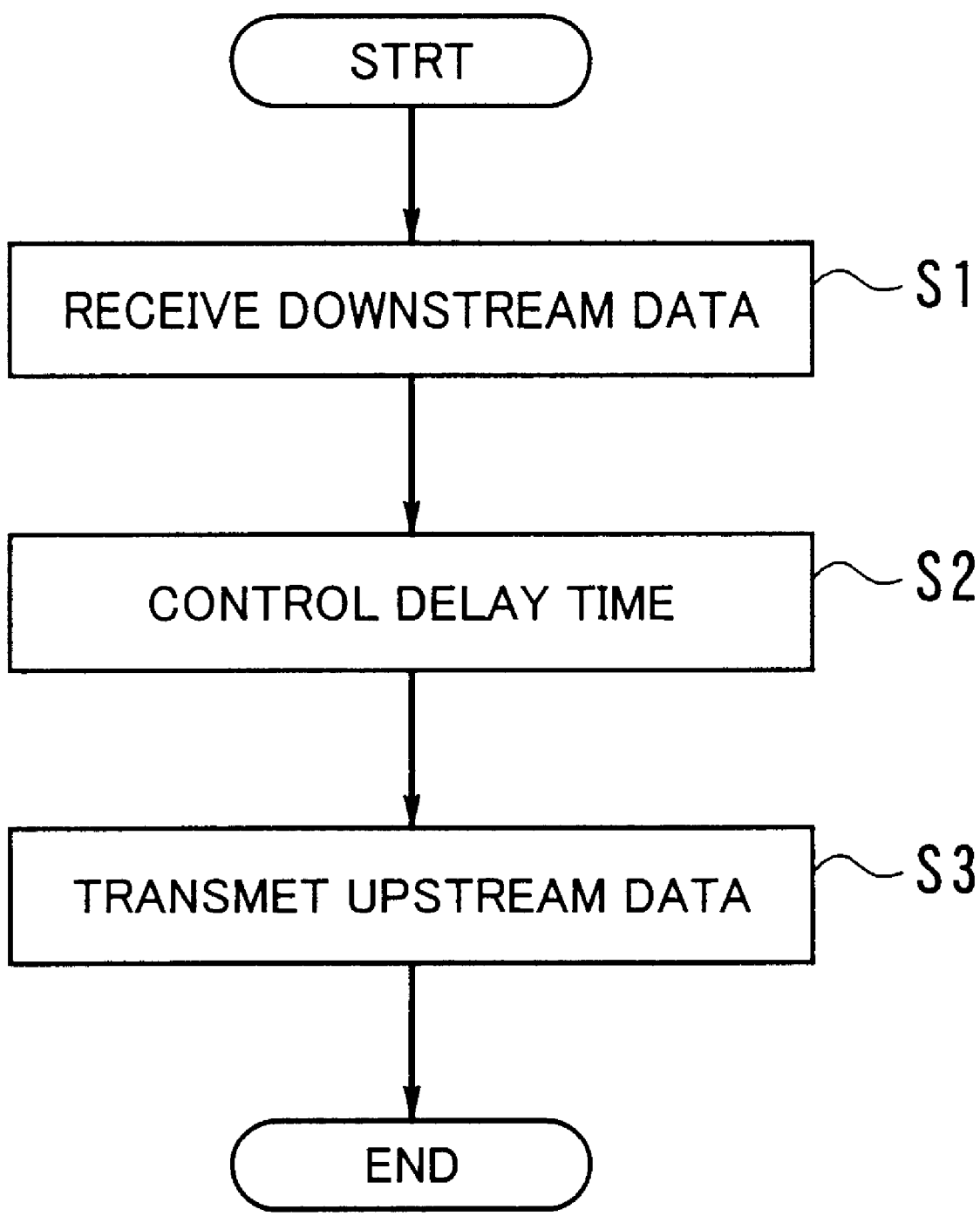
FIG. 25 is a flowchart which shows a delay adjustment process according to the present invention.
Figure 26:
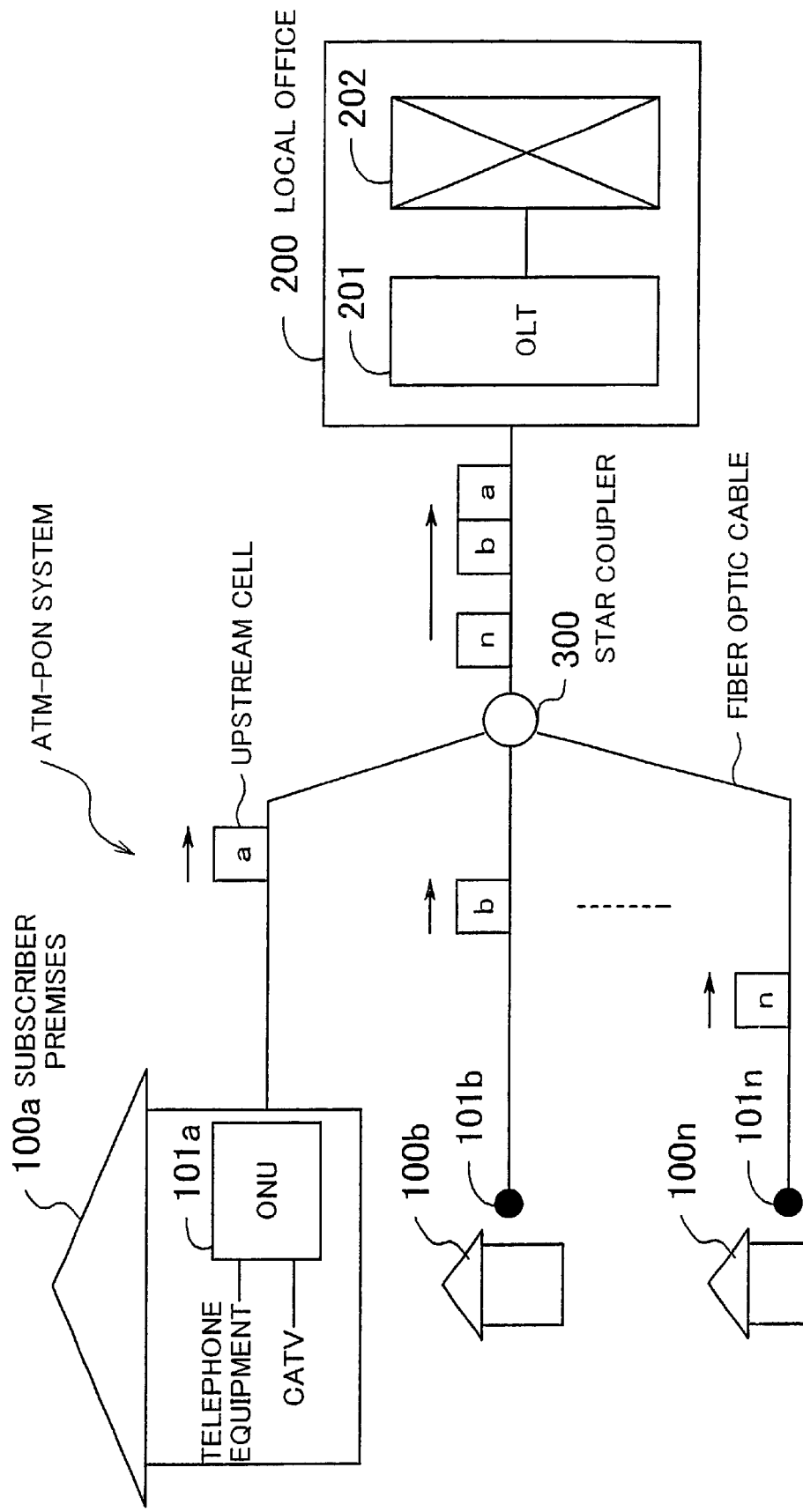
FIG. 26 is a diagram which shows a typical structure of an ATM-PON system.

Lastly, referring to a flowchart of FIG. 25, the following will describe a delay adjustment method according to the present invention. The method depicted in FIG. 25 comprises the following steps.

(S1) receiving downstream data containing control information on whether the transmission of each cell is granted or not granted;

(S2) when an equalization delay update request that requests an update of an equalization delay parameter is received, controlling the delay time of the granted cells, according to the received control information; and (3) sending upstream data containing the granted cells with the adjusted delay time.

In this delay adjustment method, the current delay parameter is compared with the new delay parameter, when attempting to transmit a granted cell after the equalization delay update request is received. If the current delay parameter is greater than the new delay parameter, one bit is removed from the upstream data. If, in turn, the current equalization delay parameter is smaller than the new equalization delay parameter, one bit is inserted into the upstream data. Those bit removal and insertion is effected at the guard bits of a cell in question.

In some cases, a non-granted cell slot may be encountered, just after an equalization delay update request is detected. If this is the case, according to the proposed delay adjustment method, the new delay parameter is activated from the first granted upstream cell after that non-granted cell slot has passed. The phase relationship between downstream cells and upstream cells is adjusted accordingly, in a bit-by-bit fashion.

The delay adjustment method of the present invention controls the delay time of each granted upstream cell, depending on whether the subsequent upstream cell slot is granted or not granted when an equalization delay update request is received. This feature enables efficient delay control, making it possible to provide high-quality data communication services.

The above explanation will now be summarized below. First, according to the present invention, the delay adjustment unit controls the amount of upstream delay time, depending on whether the transmission is permitted or not permitted for each subsequent upstream block, when it has received an updated equalization delay parameter. The present invention thus provides an efficient way of delay adjustments, as well as improving the quality of data transmission services.

Second, according to the present invention, the delay adjustment unit can make delay adjustments without interrupting upstream data transmission. This feature enables efficient delay adjustment.

Third, according to the present invention, the optical network unit controls the upstream cell delay, depending on whether each subsequent upstream block is granted or not granted, when it has received an updated equalization delay parameter. This structural arrangement enables efficient delay adjustments, as well as improving the quality of data transmission services.

Fourth, according to the delay adjustment method of the present invention, the delay time of each granted upstream cell is controlled, depending on whether the subsequent upstream cell slot is granted or not granted when an equalization delay update request is received. This feature enables efficient delay control, making it possible to provide high-quality data communication services.

Although the above discussion has focussed on ATMPON systems, the scope of the present invention should not be limited to this specific type of optical access networks. It is appreciated that the present invention applies to other communication systems that interconnect a line terminating device and customer's devices.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A delay adjustment unit which transmits upstream data composed of a plurality of data blocks after making a delay adjustment thereto, comprising:

downstream receiving means for receiving control information on whether the transmission of each data block is granted or not granted, together with an equalization delay update request that requests the delay adjustment unit to update an equalization delay parameter being held therein;

delay adjustment control means for controlling delay times of the data blocks as specified in the control information, by determining upon receipt of the equalization delay update request whether a subsequent upstream time slot is granted or not granted and then activating the updated equalization delay parameter from the next granted upstream time slot after a non-granted upstream time slot is found; and upstream transmission means for transmitting the data blocks with the adjusted delay times.

2. The delay adjustment unit according to claim 1, wherein:

said delay adjustment control means compares the new equalization delay parameter with the current equalization delay parameter, when transmitting a granted data block after the equalization delay update request is received;

if the current equalization delay parameter is greater than the new equalization delay parameter, said delay adjustment control means removes a bit from the upstream data; and if the current equalization delay parameter is smaller than the new equalization delay parameter, said delay adjustment control means inserts a bit into the upstream data.

3. The delay adjustment unit according to claim 2, wherein said delay adjustment control means removes one of guard bits contained in the data block.

4. The delay adjustment unit according to claim 1, wherein said delay adjustment control means activates the new equalization delay parameter from the granted data block that is to be transmitted first after the equalization delay update request is detected.

5. The delay adjustment unit according to claim 1, further comprising phase adjustment means for adjusting phase relationships between a downstream portion and an upstream portion of the delay adjustment unit in a bit-by-bit fashion.

6. An optical network unit, coupled to an optical access network system, which transmits upstream data composed of a plurality of upstream cells after making a delay adjustment thereto, comprising:

downstream receiving means for receiving control information on which upstream cells are granted or not granted, together with an equalization delay update request that requests the optical network unit to update an equalization delay parameter being held therein;

delay adjustment control means for controlling delay times of the upstream cells as specified in the control information, by determining upon receipt of the equalization delay update request whether a subsequent upstream time slot is granted or not granted and then activating the updated equalization delay parameter from the next granted upstream time slot after a non-granted upstream time slot is found; and upstream transmission means for transmitting the upstream cells with the adjusted delay times.

7. The optical network unit according to claim 6, wherein:

said delay adjustment control means compares the new equalization delay parameter with the current equalization delay parameter, when transmitting a granted upstream cell after the equalization delay update request is received;

if the current equalization delay parameter is greater than the new equalization delay parameter, said delay adjustment control means removes a bit from the upstream data; and if the current equalization delay parameter is smaller than the new equalization delay parameter, said delay adjustment control means inserts a bit into the upstream data.

8. The optical network unit according to claim 7, wherein said delay adjustment control means removes one of guard bits contained in the upstream cell.

9. The optical network unit according to claim 6, wherein said delay adjustment control means activates the new equalization delay parameter from the granted upstream cell that is to be transmitted first after the equalization delay update request is detected.

10. The optical network unit according to claim 6, further comprising phase adjustment means for adjusting phase relationships between a downstream portion and an upstream portion of the optical network unit in a bit-by-bit fashion.

11. A communication system which transports a data signal after making delay adjustments, comprising:

(a) an optical line terminal comprising:
downstream data producing means for producing downstream data containing control information on which upstream cells are granted or not granted, together with an equalization delay update request that requests an update of an equalization delay parameter being held in a downstream device, and
downstream transmission means for transmitting the produced downstream data; and (b) an optical network unit, disposed as the downstream device, comprising:
downstream receiving means for receiving the downstream data,
delay adjustment control means for controlling delay times of the upstream cells as specified in the control information, by determining upon receipt of the equalization delay update request whether a subsequent upstream time slot is granted or not granted and then activating the updated equalization delay parameter from the next granted upstream time slot after a non-granted upstream time slot is found, and upstream transmission means for transmitting the upstream cells with the adjusted delay times.

12. The communication system according to claim 11, wherein:

said delay adjustment control means compares a new equalization delay parameter with a current equalization delay parameter, when transmitting a granted upstream cell after the equalization delay update request is received;

if the current equalization delay parameter is greater than the new equalization delay parameter, said delay adjustment control means removes a bit from the upstream data; and if the current equalization delay parameter is smaller than the new equalization delay parameter, said delay adjustment control means inserts a bit into the upstream data.

13. The communication system according to claim 11, wherein said delay adjustment control means removes one of guard bits contained in the upstream cell.

14. The communication system according to claim 11, wherein said delay adjustment control means activates the new equalization delay parameter from the granted upstream cell that is to be transmitted first after the equalization delay update request is detected.

15. The communication system according to claim 11, further comprising phase adjustment means for adjusting phase relationships between a downstream portion and an upstream portion of the optical network unit in a bit-by-bit fashion.

16. A network unit, coupled to an access network system, which transmits upstream data composed of a plurality of upstream cells after making a delay adjustment thereto, comprising:

downstream receiving means for receiving control information on which upstream cells are granted or not granted, together with an equalization delay update request that requests the network unit to update an equalization delay parameter being held therein;

delay adjustment control means for controlling delay times of the upstream cells as specified in the control information, by determining upon receipt of the equalization delay update request whether a subsequent upstream time slot is granted or not granted and then activating the updated equalization delay parameter from the next granted upstream time slot after a non-granted upstream time slot is found; and upstream transmission means for transmitting the upstream cells with the adjusted delay times.

17. A delay adjustment unit which performs delay adjustments, comprising:

receiving means for receiving information about a delay parameter;

delay adjustment control means for controlling a delay time of a data signal to be transmitted, based on the delay parameter, by determining, upon receipt of the information, whether a subsequent data signal to be transmitted is granted or not granted and then activating an updated delay time, based upon the received information, from the next granted data signal to be transmitted after a non-granted data signal is found; and transmission means for transmitting the data signal with the adjusted delay time.

18. The delay adjustment unit according to claim 17, wherein:

said delay adjustment control means compares a new delay parameter with a current delay parameter;

if the current delay parameter is greater than the new delay parameter, said delay adjustment control means removes a bit from the data signal to be transmitted; and if the current delay parameter is smaller than the new delay parameter, said delay adjustment control means inserts a bit into the data signal to be transmitted.

19. The delay adjustment unit according to claim 18, wherein said delay adjustment control means removes one of guard bits contained in the data signal to be transmitted.

20. A delay adjustment method which transmits upstream data composed of a plurality of upstream cells after making a delay adjustment thereto, comprising the steps of:

receiving downstream data containing control information on whether the transmission of each upstream cell is granted or not granted;

when an equalization delay update request that requests an update of an equalization delay parameter is received, controlling delay times of the upstream cells as specified in the control information, by determining upon receipt of the equalization delay update request whether a subsequent upstream time slot is granted or not granted and then activating the updated equalization delay parameter from the next granted upstream time slot after a non-granted upstream time slot is found; and sending upstream data with the adjusted delay times.

* * * * *